(12) United States Patent
Mitani et al.

(10) Patent No.: US 12,444,018 B2
(45) Date of Patent: Oct. 14, 2025

(54) INFORMATION PROCESSING APPARATUS, INFORMATION PROCESSING METHOD, AND INFORMATION PROCESSING PROGRAM

(71) Applicant: Sony Group Corporation, Tokyo (JP)

(72) Inventors: Hitoshi Mitani, Kanagawa (JP); Masafumi Wakazono, Tokyo (JP)

(73) Assignee: Sony Group Corporation, Tokyo (JP)

( * ) Notice: Subject to any disclaimer, the term of this patent is extended or adjusted under 35 U.S.C. 154(b) by 422 days.

(21) Appl. No.: 18/008,836

(22) PCT Filed: Apr. 30, 2021

(86) PCT No.: PCT/JP2021/017215
§ 371 (c)(1),
(2) Date: Dec. 7, 2022

(87) PCT Pub. No.: WO2021/256107
PCT Pub. Date: Dec. 23, 2021

(65) Prior Publication Data
US 2023/0214959 A1 Jul. 6, 2023

(30) Foreign Application Priority Data
Jun. 15, 2020 (JP) .................................. 2020-103319

(51) Int. Cl.
*H04N 23/86* (2023.01)
*G06T 3/4007* (2024.01)
(Continued)

(52) U.S. Cl.
CPC .............. *G06T 3/4007* (2013.01); *G06T 5/50* (2013.01); *G06T 2207/10024* (2013.01); *G06T 2207/20216* (2013.01); *G06T 2207/20224* (2013.01)

(58) Field of Classification Search
CPC .................... G06T 3/4007; G06T 5/50; G06T 2207/10024; G06T 2207/20216;
(Continued)

(56) References Cited

U.S. PATENT DOCUMENTS

2006/0245646 A1* 11/2006 Ishiga ................... G06T 3/4007
382/167
2021/0321069 A1* 10/2021 Seok ........................ G06T 5/50

FOREIGN PATENT DOCUMENTS

JP         860201790 A      10/1985
JP         S60201790 A   *  10/1985
(Continued)

OTHER PUBLICATIONS

International Search Report (PCT/ISA/210), International Application No. PCT/JP2021/017215, dated Jul. 27, 2021.

*Primary Examiner* — Andrew M Moyer
*Assistant Examiner* — Dylan John Mendez Muniz
(74) *Attorney, Agent, or Firm* — Michael Best & Friedrich LLP

(57) ABSTRACT

An information processing apparatus includes an interpolation target color difference pixel generator that generates, on the basis of a relationship between a luminance pixel at an interpolation target pixel position that is a pixel position at which a first color difference pixel does not exist and the luminance pixel at at least one neighboring pixel position of a plurality of pixel positions near the interpolation target pixel position in image data, an interpolation target color difference pixel corresponding to the first color difference pixel at the interpolation target pixel position, in which the image data is generated on the basis of three primary color pixels that can include a value greater than a predetermined white clip value, the image data having a number of the luminance pixels larger than a number of the first color (Continued)

difference pixels and a number of second color difference pixels.

17 Claims, 16 Drawing Sheets

(51) Int. Cl.
*G06T 5/50* (2006.01)
*H04N 11/20* (2006.01)
*H04N 23/85* (2023.01)

(58) Field of Classification Search
CPC .......... G06T 2207/20224; H04N 23/86; H04N 23/85; H04N 11/20; H04N 19/587; H03M 3/462

See application file for complete search history.

(56) References Cited

FOREIGN PATENT DOCUMENTS

| | | | |
|---|---|---|---|
| JP | H04315392 A | * | 4/1991 |
| JP | H0654338 A | * | 7/1992 |
| JP | H04247791 A | | 9/1992 |
| JP | 106054338 A | | 2/1994 |
| JP | H06327017 A | | 11/1994 |
| JP | H07110065 B2 | | 11/1995 |
| JP | 2002320135 A | | 10/2002 |
| JP | 2005109705 A | * | 9/2003 |
| JP | 2016005245 A | | 1/2016 |

* cited by examiner

FIG. 6
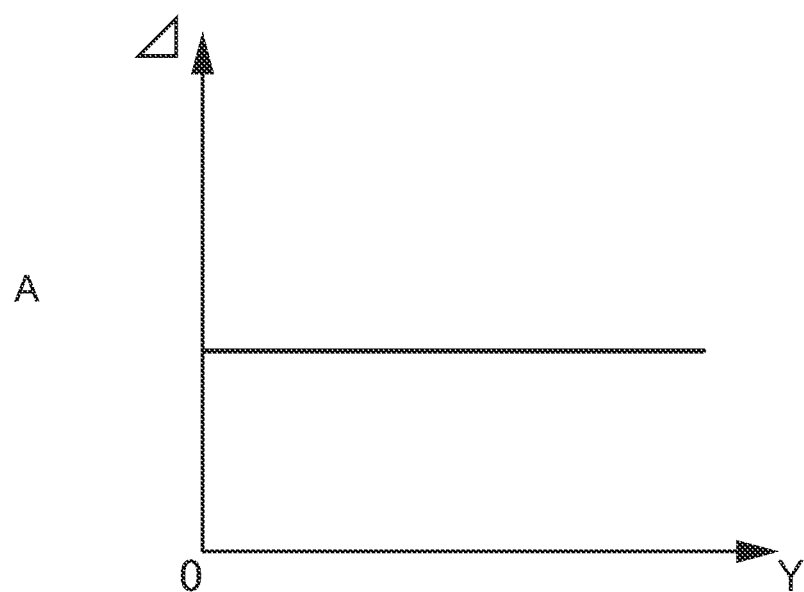
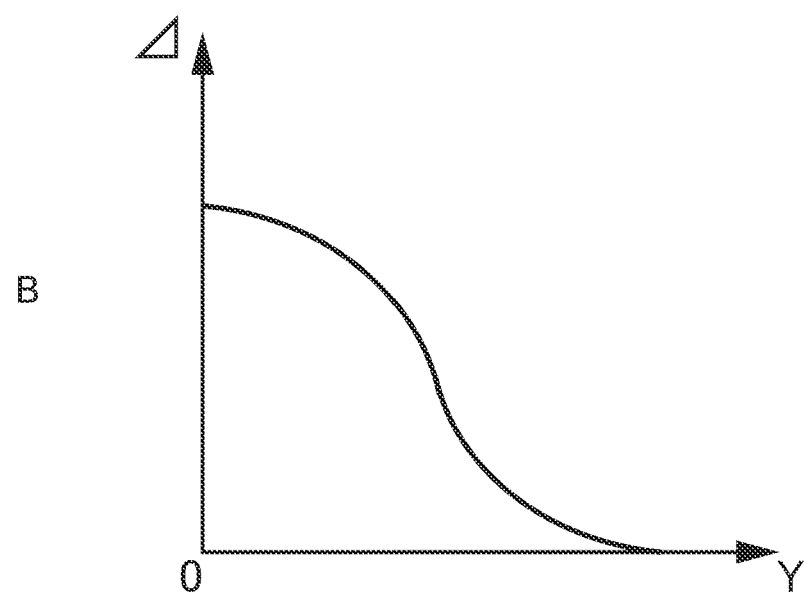

FIG. 7
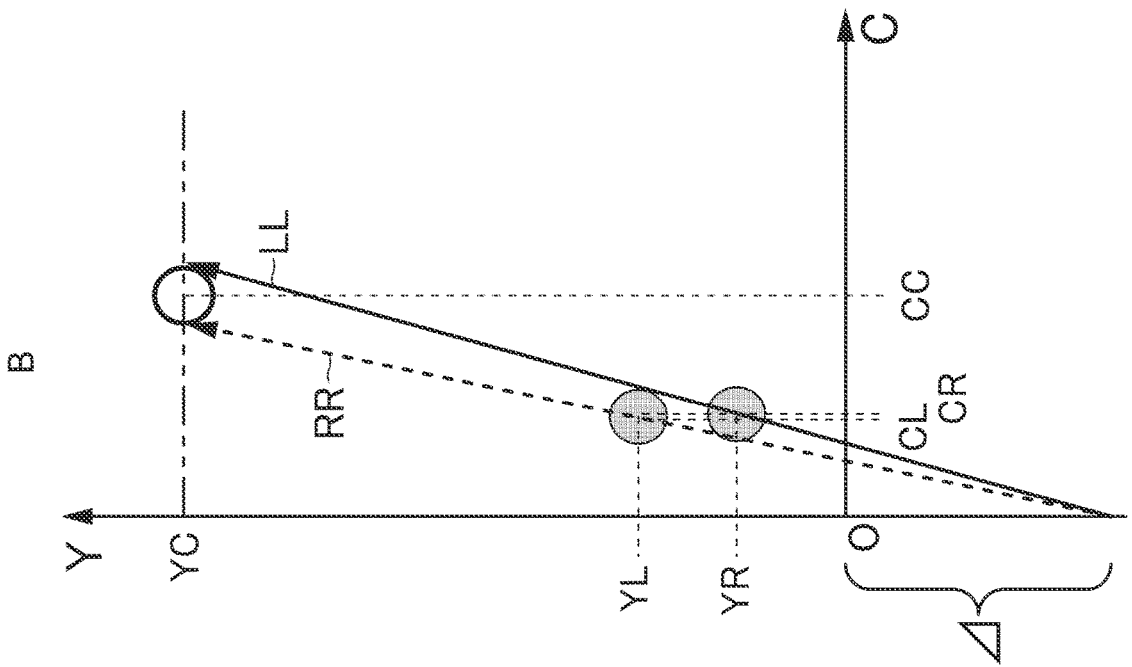
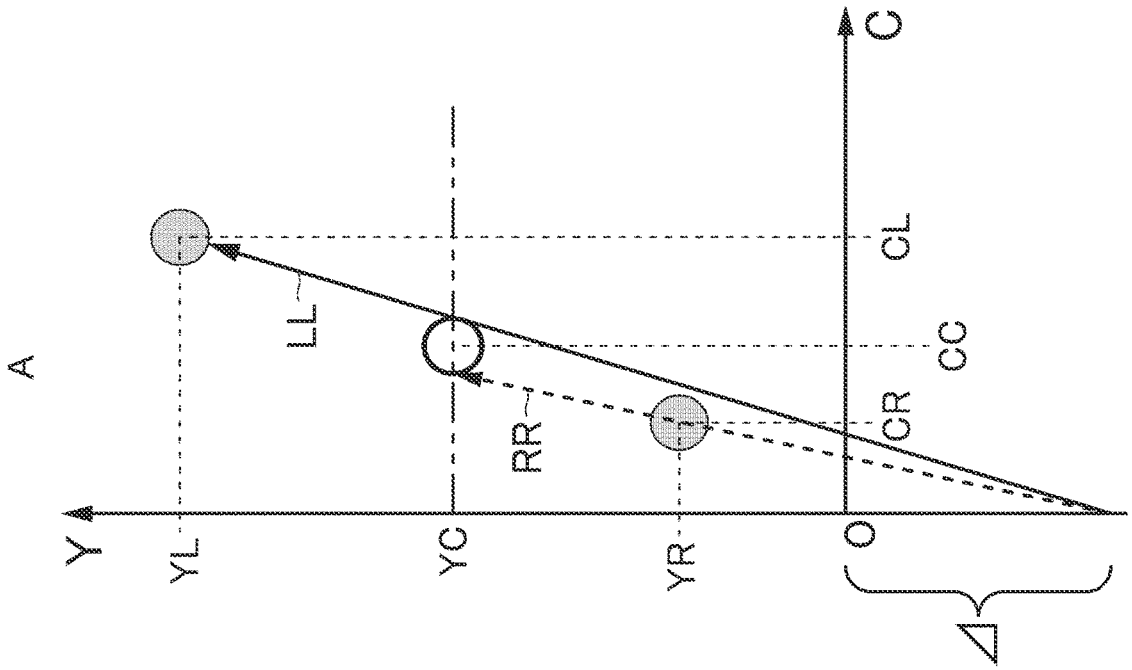

*FIG. 11*

|  | $DL \leq th2$ ($\alpha=0$) | $th2 \leq DL \leq th1$ ($0 \leq \alpha \leq 1$) | $th1 \leq DL$ ($\alpha=1$) |
|---|---|---|---|
| $DR \leq th2$ ($\beta=0$) | (1) $(CL+CR)/2$ | (2) $(1-\alpha)(CL+CR)/2 + \alpha CR$ | (3) $CR$ |
| $th2 \leq DR \leq th1$ ($0 \leq \beta \leq 1$) | (4) $(1-\beta)(CL+CR)/2 + \beta CL$ | (5) CC=(EQUATION BELOW) | (6) $(1-\beta)CR$ |
| $th1 \leq DR$ ($\beta=1$) | (7) $CL$ | (8) $(1-\alpha)CL$ | (9) $0$ (ACHROMATIC COLOR) |

EQUATION OF (5)

$$CC = \{(1-\alpha)(1+\beta)CL + (1+\alpha)(1-\beta)CR\}/2$$

$$A = (1-\alpha\beta)/2, \quad B = (\alpha-\beta)/2 \quad \text{AND THEN,}$$

$$CC = (A-B)CL + (A+B)CR$$

$$= A*(CL+CR) - B*(CL-CR)$$

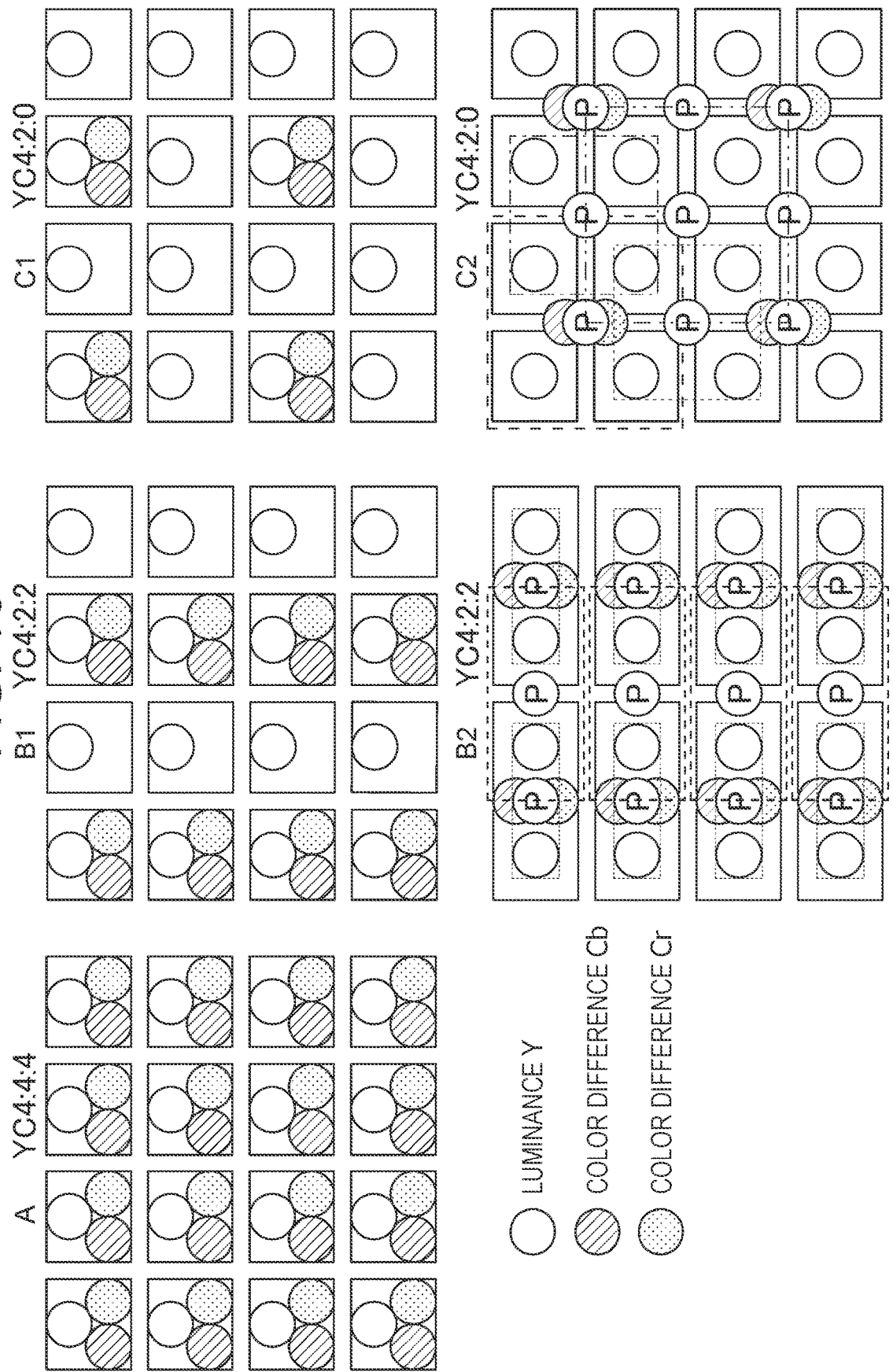

INFORMATION PROCESSING APPARATUS, INFORMATION PROCESSING METHOD, AND INFORMATION PROCESSING PROGRAM

TECHNICAL FIELD

The present technology relates to an information processing apparatus, an information processing method, and an information processing program.

BACKGROUND ART

Conventionally, image recording includes a method of developing an output from an imager and saving a finished image (JPG or the like), and a method of recording information included in the output from the imager as such (RAW recording) so that development can be performed by adjusting gradation, hue, and the like later.

In RAW recording, in addition to a method of recording the output from the imager (for example, RGB signals in a Bayer array) as such, there is a method of performing a certain degree of signal processing in a camera to shorten a development processing period, separating the signal into a luminance signal and a color difference signal, and recording YCbCr. Of YCbCr, CbCr that is a color difference signal may be decimated in order to reduce a data amount (Patent Document 1).

CITATION LIST

Patent Document

Patent Document 1: Japanese Patent Application Laid-Open No. 2016-005245

SUMMARY OF THE INVENTION

Problems to be Solved by the Invention

In a case where the color difference signal CbCr is decimated, processing of interpolating the decimated color difference signal is performed before development processing, but conventionally, interpolation has been performed by using only the color difference signal without using the luminance signal. As a result, there is a problem that an image quality of the developed image is degraded due to unintended coloring or the like.

The present technology has been made in view of such a point, and an object of the present technology is to provide an information processing apparatus, an information processing method, and an information processing program capable of interpolating decimated pixels without degrading an image quality of an image.

Solutions to Problems

In order to solve the above-described problem, a first technology is an information processing apparatus including an interpolation target color difference pixel generator that generates, on the basis of a relationship between a luminance pixel at an interpolation target pixel position that is a pixel position at which a first color difference pixel does not exist and the luminance pixel at at least one neighboring pixel position of a plurality of pixel positions near the interpolation target pixel position in image data, an interpolation target color difference pixel corresponding to the first color difference pixel at the interpolation target pixel position, in which the image data is generated on the basis of three primary color pixels that can include a value greater than a predetermined white clip value, the image data having a number of the luminance pixels larger than a number of the first color difference pixels and a number of second color difference pixels.

In addition, a second technology is an information processing method including generating, on the basis of a relationship between a luminance pixel at an interpolation target pixel position that is a pixel position at which a first color difference pixel does not exist and the luminance pixel at at least one neighboring pixel position of a plurality of pixel positions near the interpolation target pixel position in image data, an interpolation target color difference pixel corresponding to the first color difference pixel at the interpolation target pixel position, in which the image data is generated on the basis of three primary color pixels that can include a value greater than a predetermined white clip value, the image data having a number of the luminance pixels larger than a number of the first color difference pixels and a number of second color difference pixels.

Furthermore, a third technology is a program that causes a computer to execute an information processing method including generating, on the basis of a relationship between a luminance pixel at an interpolation target pixel position that is a pixel position at which a first color difference pixel does not exist and the luminance pixel at at least one neighboring pixel position of a plurality of pixel positions near the interpolation target pixel position in image data, an interpolation target color difference pixel corresponding to the first color difference pixel at the interpolation target pixel position, in which the image data is generated on the basis of three primary color pixels that can include a value greater than a predetermined white clip value, the image data having a number of the luminance pixels larger than a number of the first color difference pixels and a number of second color difference pixels.

BRIEF DESCRIPTION OF DRAWINGS

FIG. 6 is an explanatory diagram of the offset value Δ.

FIG. 7 is a diagram schematically illustrating interpolation processing according to the first embodiment.

FIG. 11 is a table illustrating a second method of the interpolation processing according to the second embodiment.

FIG. 16 is an explanatory diagram of arrangement of a pixel position according to a modification.

MODE FOR CARRYING OUT THE INVENTION

Hereinafter, embodiments of the present technology will be described with reference to the drawings. Note that the description will be made in the following order.
<1. First Embodiment>
 [1-1. Configurations of imaging device 10 and developing device 20]
 [1-2. Mechanism of image quality degradation]
 [1-3. Configuration of information processing apparatus 100]
 [1-4. Processing by information processing apparatus 100]
<2. Second Embodiment>
 [2-1. Configuration of information processing apparatus 200]
 [2-2. Processing by information processing apparatus 200]
<3. Third Embodiment>
 [3-1. Configuration of information processing apparatus 300]
 [3-2. Processing by information processing apparatus 300]
<4. Modifications>

1. First Embodiment

[1-1. Configurations of Imaging Device 10 and Developing Device 20]

Figure 1:
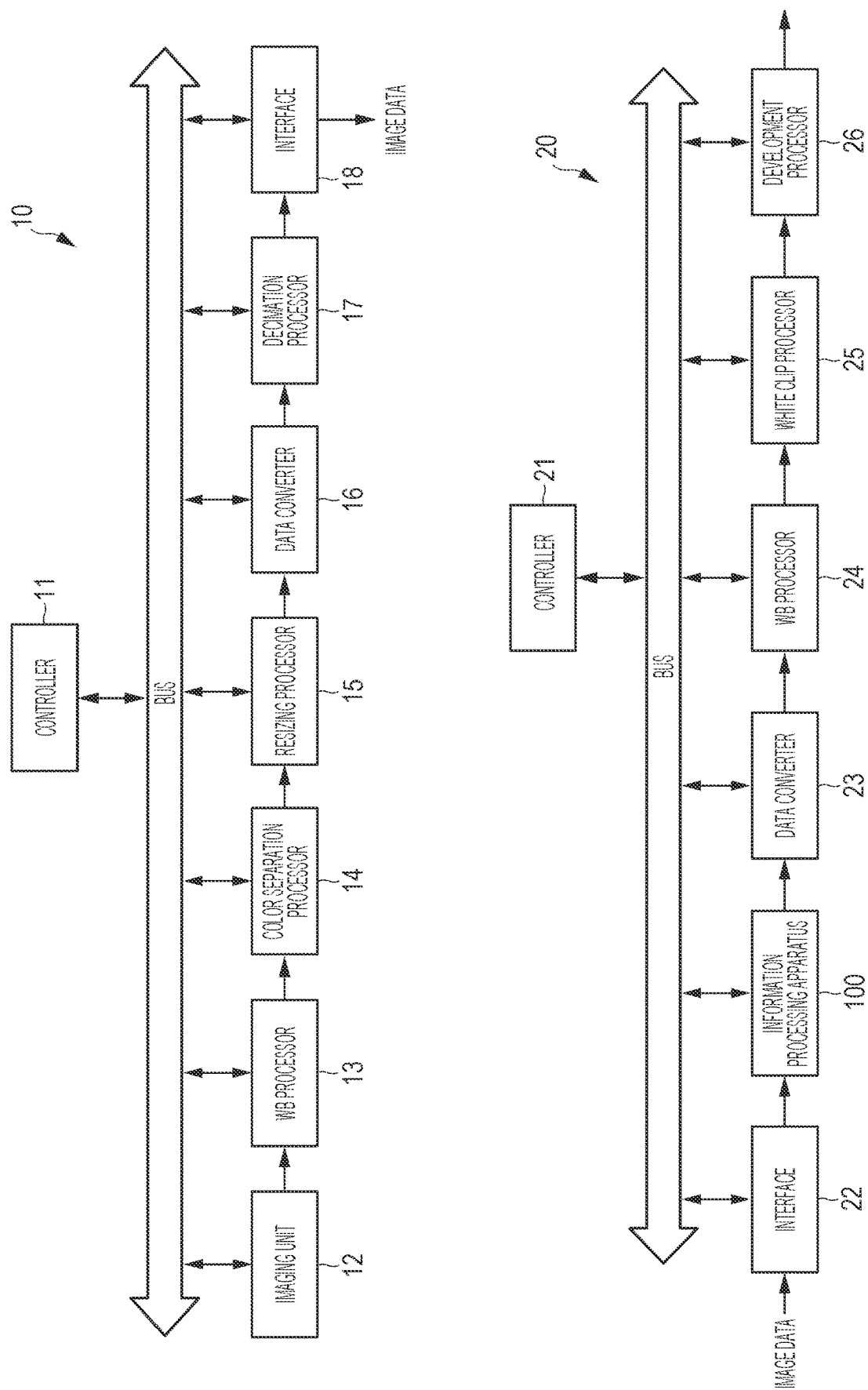
FIG. 1 is a block diagram illustrating configurations of an imaging device 10 and a developing device 20.

Configurations of an imaging device 10 that generates image data by imaging and a developing device 20 that develops the imaged image data will be described with reference to FIG. 1. The imaging device 10 includes a controller 11, an imaging unit 12, a white balance processor 13, a color separation processor 14, a resizing processor 15, a signal converter, a decimation processor 17, and an interface 18.

The controller 11 includes a central processing unit (CPU), a random access memory (RAM), a read only memory (ROM), and the like. The CPU controls the entire imaging device 10 and each unit by executing various processing in accordance with a program stored in the ROM and issuing commands.

The imaging unit 12 can capture images corresponding to three primary color pixels. The imaging unit 12 includes a lens, an imaging element that photoelectrically converts incident light from a subject obtained through the lens into a charge amount and outputs an imaging signal, a lens drive driver that drives the lens, a processor that generates image data by performing analog/digital (A/D) conversion or the like on the imaging signal, and the like. Examples of the imaging element include a charge coupled device (CCD), a complementary metal oxide semiconductor (CMOS), and the like.

The white balance processor 13 performs white balance processing on the image data on the basis of an arbitrary white balance setting set by a user.

The color separation processor 14 performs, for example, demosaic processing as color separation processing on the image data subjected to the white balance processing.

The resizing processor 15 performs resizing processing of adjusting a size of the image data by changing the number of pixels or the like.

The data conversion processor 16 converts RGB image data into YC image data including a luminance signal and a color difference signal.

The decimation processor 17 decimates color difference pixels from the image data. The image data before decimation is YC 4:4:4 (luminance signal Y:color difference signal Cb:color difference signal Cr=4:4:4), and the image data after the luminance pixels are decimated by decimation processing is, for example, YC 4:2:2 (luminance Y:color difference Cb:color difference Cr=4:2:2). The decimation processing can reduce a file size of the image data and shorten transfer time.

The interface 18 is an interface with the developing device 20, other devices, a network, and the like. The interface 18 can include a wired or wireless communication interface. Furthermore, specifically, the wired or wireless communication interface can include cellular communication such as 3TTE, 4G, 5G, Wi-Fi, Bluetooth (registered trademark), near field communication (NFC), Ethernet (registered trademark), high-definition multimedia interface (HDMI (registered trademark)), universal serial bus (USB), and the like. Furthermore, in a case where all or a part of the imaging device 10 and the developing device 20 is implemented by the same device, the interface 18 can include a bus in the device, data reference in a program module, and the like (hereinafter, also referred to as interfaces in the device). In addition, in a case where the imaging device 10 and the developing device 20 are implemented in a distributed manner in a plurality of devices, the interface 18 can include different types of interfaces for the respective devices. For example, the interface 18 may include both a communications interface and an interface in the device.

The image data subjected to the decimation processing is transferred from the imaging device 10 to the developing device 20 via the interface 18 for development. This image data is image data to be processed in the information processing apparatus 100. The image data as a processing target is image data generated on the basis of three primary color pixels that can include a value larger than a predetermined white clip value, the image data having the number of luminance pixels (Y) larger than the number of first color difference pixels (one of Cb or Cr) and the number of second color difference pixels (the other one of Cb or Cr) due to the decimation processing.

Note that, although not illustrated, a storage that saves image data and the like, an input unit including a shutter button and the like operated by a photographer, a display that displays a through-the-lens image, a captured image, a UI, and the like are provided.

The imaging device 10 is configured as described above. Examples of the imaging device 10 include a smartphone, a tablet terminal, a wearable device, a portable game machine, and the like having a camera function in addition to devices specialized in camera functions such as a digital camera, a single-lens reflex camera, a camcorder, a business camera, and professional specification imaging equipment.

The developing device 20 includes a controller 21, an interface 22, an information processing apparatus 100, a data conversion processor 23, a white balance processor 24, a white clip processor 25, and a development processor 26.

The controller 21 is implemented by the CPU executing various processing in accordance with a program and issuing commands, and controls the entire developing device 20 and each unit.

The interface 22 is similar to the interface included in the imaging device 10, and is an interface with the imaging device 10, other devices, a network, and the like. Image data as a processing target of the information processing apparatus 100 is transferred from the imaging device 10 to the developing device 20 via the interface 22.

The information processing apparatus 100 performs interpolation processing by generating an interpolation target color difference pixel at a pixel position where a color difference pixel is decimated. A configuration of the information processing apparatus 100 will be described later.

The data conversion processor 23 converts YC image data including a luminance signal and a color difference signal into RGB image data.

The white balance processor 24 performs white balance processing on RGB image data.

The white clip processor 25 performs white clip processing on the image data subjected to the white balance processing. It is assumed that a white clip value serving as a reference of processing in the white clip processor corresponds to a predetermined white clip value, and image data as a processing target in the present technology is image data including the three primary color pixels that can include a value larger than the predetermined white clip value.

The development processor 26 performs processing such as edge enhancement, resolution conversion, and image compression, for example, and finally generates image data to be saved and output as a captured image.

The developing device 20 is configured as described above. The developing device 20 may be configured as a single device or may operate in a terminal device such as a personal computer, a tablet terminal, or a smartphone. A program for performing processing of the developing device 20 may be installed in the terminal device in advance, or may be distributed by download, a storage medium, or the like and installed by the photographer himself/herself. Furthermore, the developing device 20 may be configured as a dedicated device by hardware having the function.

[1-2. Causes of Image Quality Degradation]

Figure 2:
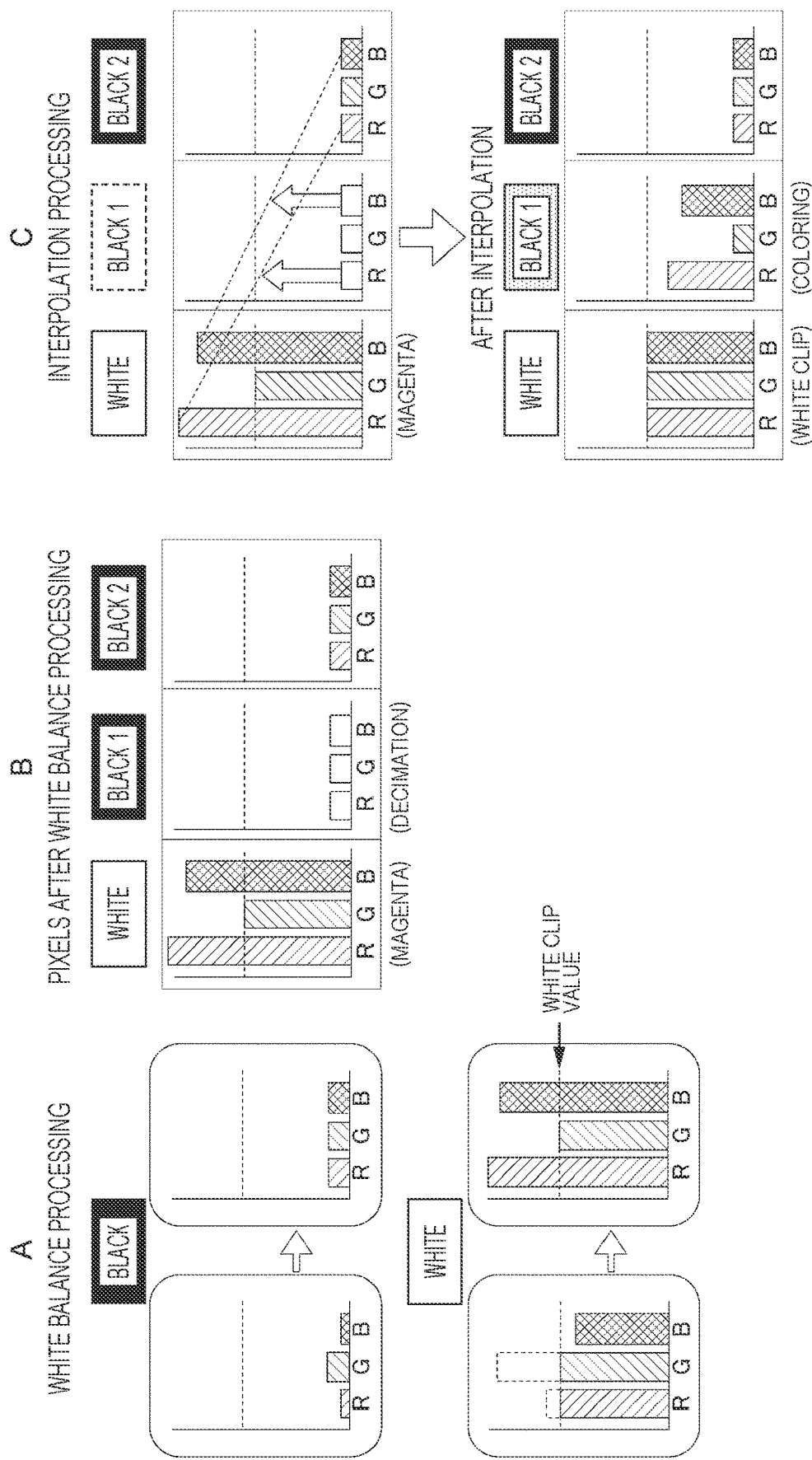
FIG. 2 is an explanatory diagram of a mechanism of image quality degradation.

Here, with reference to FIG. 2, description will be made of a mechanism of image quality degradation that occurs in a case where interpolation processing is performed by a method using only color difference pixels after the color difference pixels are decimated from the image data. Here, a case where three pixels of white (blown out highlights), black 1, and black 2 are to be processed will be described as an example. Both RGB values of black 1 and black 2 are low. On the other hand, it is assumed that white (blown out highlights) has high RGB values, and G and R are saturated beyond a dynamic range of the imaging element. This is due to a difference in characteristics of RGB color filters.

As illustrated in FIG. 2A, when the white balance processing is performed on the pixels of white, black 1, and black 2, signal levels of R and B become signal levels higher than G. In order to leave color information as RAW as much as possible so that the photographer can adjust RGB by performing the white balance processing again at the time of development, the white clip processing is not performed before the interpolation processing, and the signal levels of R and B are allowed to be higher than G. Then, as illustrated in FIG. 2B, R and B of white pixels are lifted and highlighted to be turned into magenta (bright and vivid reddish purple). In addition, it is assumed that the color difference of black 1 at the center among white, black 1, and black 2 is decimated by the decimation processing. Then, pixels of black 1 are the interpolation target pixel position, and the white pixels and the black pixels are the neighboring pixel positions used for interpolation. Note that, in the decimated pixels of black 1, the luminance signal remains without being decimated.

In this state, interpolation of the decimated pixels of black 1 is performed using only the color difference signal of the pixels of white and the pixels of black 2, which are the neighboring pixel positions, and then, as illustrated in FIG. 2C, the interpolation target pixel position is colored in a color other than black due to white that turned into magenta. Note that white that turned into magenta returns to white by suppressing R and B lifted in the white clip processing after the interpolation processing.

In this way, a color that is not the original color of the pixel is applied by the interpolation processing, and thus, an unnatural color is applied in an output image, and an image quality is degraded. Note that, here, white and black pixels are taken as an example, but the present technology is not limited to white and black.

[1-3. Configuration of Information Processing Apparatus 100]

Figure 3:
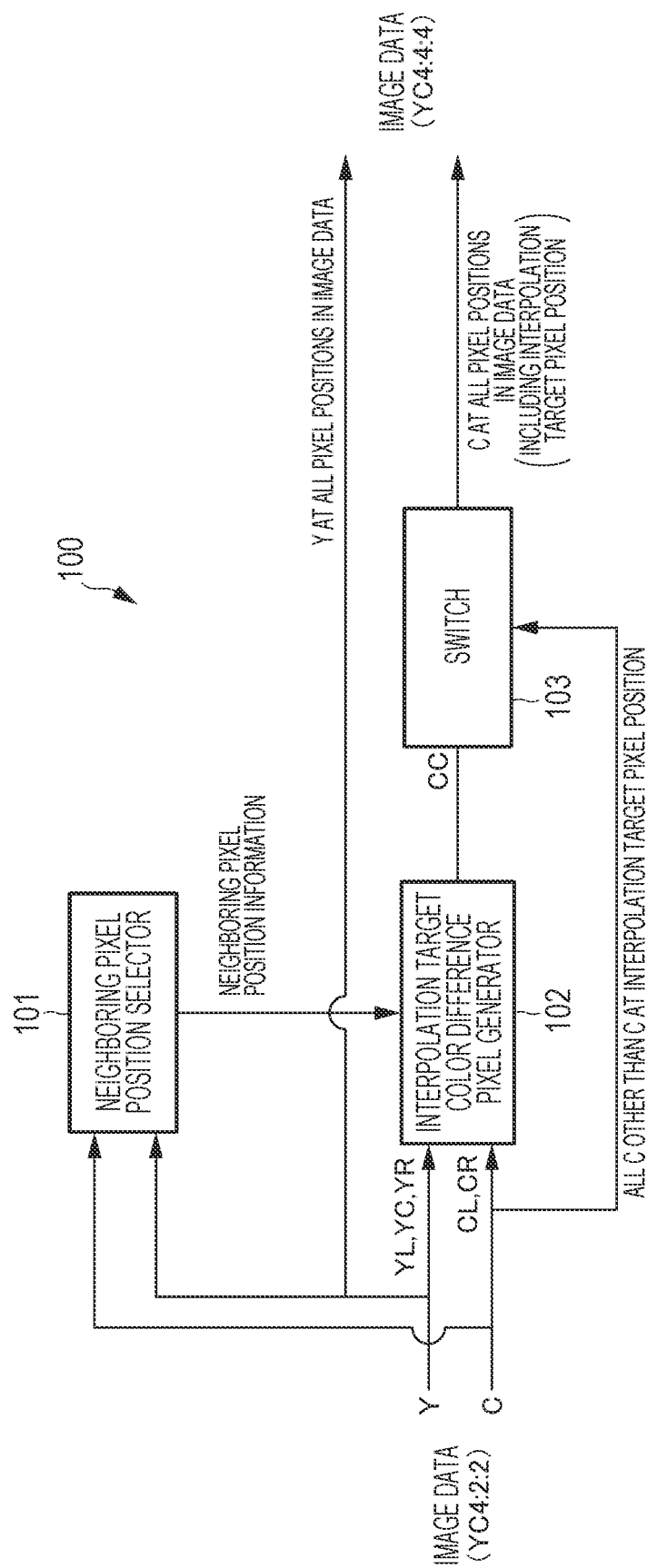
FIG. 3 is a block diagram illustrating a configuration of an information processing apparatus 100 according to a first embodiment.

Next, a configuration of the information processing apparatus 100 according to the first embodiment will be described with reference to FIG. 3. The information processing apparatus 100 includes a neighboring pixel position selector 101, an interpolation target color difference pixel generator 102, and a switch 103.

As the image data as a processing target, the information processing apparatus 100 receives input of image data generated on the basis of the three primary color pixels that can include a value larger than a predetermined white clip value, the image data having the number of luminance pixels (Y) larger than the number of first color difference pixels (one of Cb or Cr) and the number of second color difference pixels (the other one of Cb or Cr). It is assumed that the image data is image data of YC 4:2:2 in which the color difference signal is decimated by the decimation processing in the imaging device 10. Note that it is assumed that the controller 21 or the like knows which pixel among the pixels constituting the image data is being processed.

The neighboring pixel position selector 101 selects a position of a neighboring pixel to be used for generating an interpolation target color difference pixel from among a plurality of pixel positions on the basis of a luminance signal and/or a color difference signal constituting image data as a processing target. The signal input to the neighboring pixel position selector 101 may be a luminance signal or a color difference signal.

Note that a neighboring pixel is not necessarily in contact with the interpolation target pixel position, but are located in a predetermined range around the interpolation target color difference pixel. For example, the interpolation target color difference pixel may be a pixel near the interpolation target color difference pixel two or three pixels away. Note that, in terms of interpolation accuracy, it is considered that the neighboring pixel is preferably adjacent to and in contact with the interpolation target color difference pixel. The interpolation target pixel position is a pixel position where the color difference pixels are decimated by the decimation processing, that is, a pixel position where at least one of the first color difference pixel or the second color difference pixel does not exist, and is a pixel position to be interpolated by the interpolation target color difference pixel generator 102.

Two or more pixels adjacent to and in contact with the interpolation target pixel position may be selected as the neighboring pixel position, the neighboring pixel position may be selected on the basis of a result of edge extraction, or the neighboring pixel position may be selected on the basis of a format (YC 4:2:2, YC 4:2:0, etc.) of the image data as a processing target. Furthermore, the neighboring pixel position may be selected from a correlation of a luminance and a color difference.

The interpolation target color difference pixel generator 102 calculates a color difference at the interpolation target pixel position by using the luminance and the color difference at the neighboring pixel position on the basis of the fact that there is a positive correlation between magnitudes (absolute values) of values of the luminance and the color difference constituting the image data and generates the interpolation target color difference pixel. By generating the interpolation target color difference pixel at the interpolation target pixel position, interpolation of the decimated pixels is performed. Note that the positive correlation may be linear, or may be a positive correlation represented by non-linear, quadratic, cubic, exponential, or the like other than linear.

The switch 103 outputs the interpolation target color difference pixel generated by the interpolation target color difference pixel generator 102 and all the color difference pixels other than the color difference pixel at the interpolation target pixel position in the image data in an appropriate order as all the color difference pixels that constitute the image data.

Since all the decimated color difference pixels are interpolated by the interpolation target color difference pixels, the image data output from the information processing apparatus 100 has a format of YC 4:4:4.

The information processing apparatus 100 is configured as described above. The information processing apparatus 100 may be configured by a program, and the developing device 20 may have a function as the information processing apparatus 100 by executing the program. The program may be installed in advance in a terminal device in which the developing device 20 operates, or may be downloaded, distributed in a storage medium, or the like, and installed in the terminal device by the user himself/herself. Furthermore, the information processing apparatus 100 may be configured as a dedicated device by hardware having the function.

In addition, the information processing apparatus 100 may have functions as the white balance processor 13, the imaging unit 12, and the imaging device 10.

[1-4. Processing by Information Processing Apparatus 100]

Next, the processing of the information processing apparatus 100 according to the first embodiment will be described.

First, the neighboring pixel position selector 101 selects a neighboring pixel position to be used for generating an interpolation target color difference pixel at the interpolation target pixel position from among a plurality of pixel positions constituting the image data. Note that the number of neighboring pixel positions is not limited to one, and may be one or three or more.

The neighboring pixel position selector 101 selects a neighboring pixel position, and then, neighboring pixel position information is supplied to the interpolation target color difference pixel generator 102.

Figure 4:
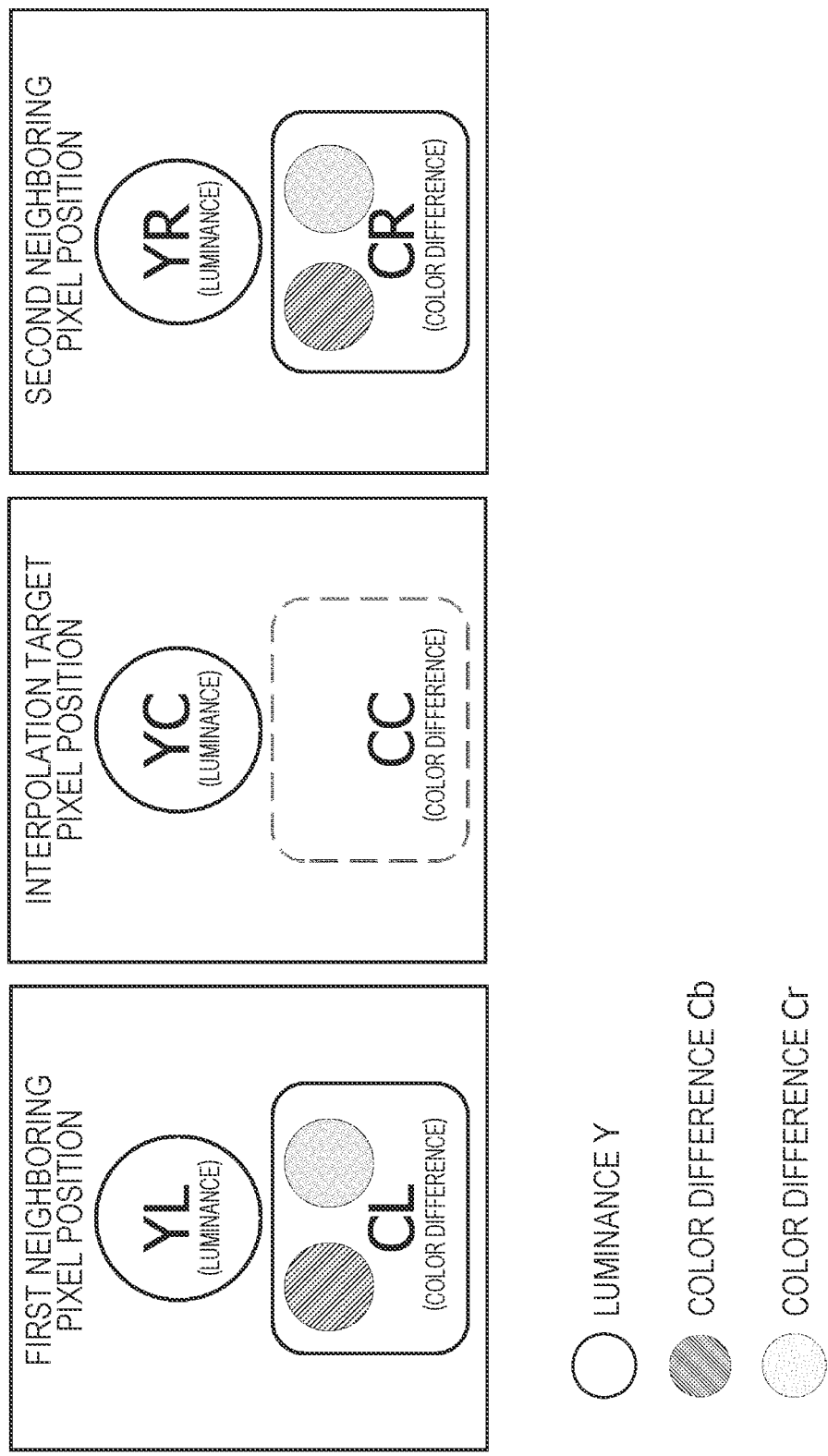
FIG. 4 is an explanatory diagram of an interpolation target pixel position and a neighboring pixel position.

Here, as illustrated in FIG. 4, a value of the color difference pixel at the interpolation target pixel position is referred to as a color difference CC, and a value of the luminance pixel at the interpolation target pixel position is referred to as luminance YC. In addition, a value of the color difference pixel at a first neighboring pixel position used for the interpolation processing is referred to as a color difference CL, and a value of the luminance pixel at the first neighboring pixel position is referred to as luminance YL. Furthermore, a value of the color difference pixel at a second neighboring pixel position used for the interpolation processing is referred to as a color difference CR, and a value of the luminance pixel at the second neighboring pixel position is referred to as luminance YR.

In the first embodiment, the interpolation target color difference pixel generator 102 generates the interpolation target color difference pixel by calculating the color difference CC at the interpolation target pixel position by using the color difference CL and the luminance YL at the first neighboring pixel position and the color difference CR and the luminance YR at the second neighboring pixel position by Equation 1 below. This corresponds to "generating an interpolation target color difference pixel on the basis of a relationship between the value of the luminance pixel at the interpolation target pixel position and the value of the luminance pixel at the neighboring pixel position".

$$CC = \left(\frac{C_L}{Y_L + \Delta} + \frac{C_R}{Y_R + \Delta}\right) / 2 \times (Y_C + \Delta) \quad \text{[Equation 1]}$$

Equation 1 is an equation defined such that the luminance and the color difference have a linear relationship of positive correlations, and the color difference pixel CC at the interpolation target pixel position is calculated by using a ratio of the color difference CL and the luminance YL at the first neighboring pixel position and a ratio of the color difference CR and the luminance YL at the second neighboring pixel position to generate the interpolation target color difference pixel.

In Expression 1, an offset value $\Delta$ is used as an offset with respect to the luminance in order to prevent noise from being amplified due to either the luminance YL or the luminance YR being small.

Figure 5:
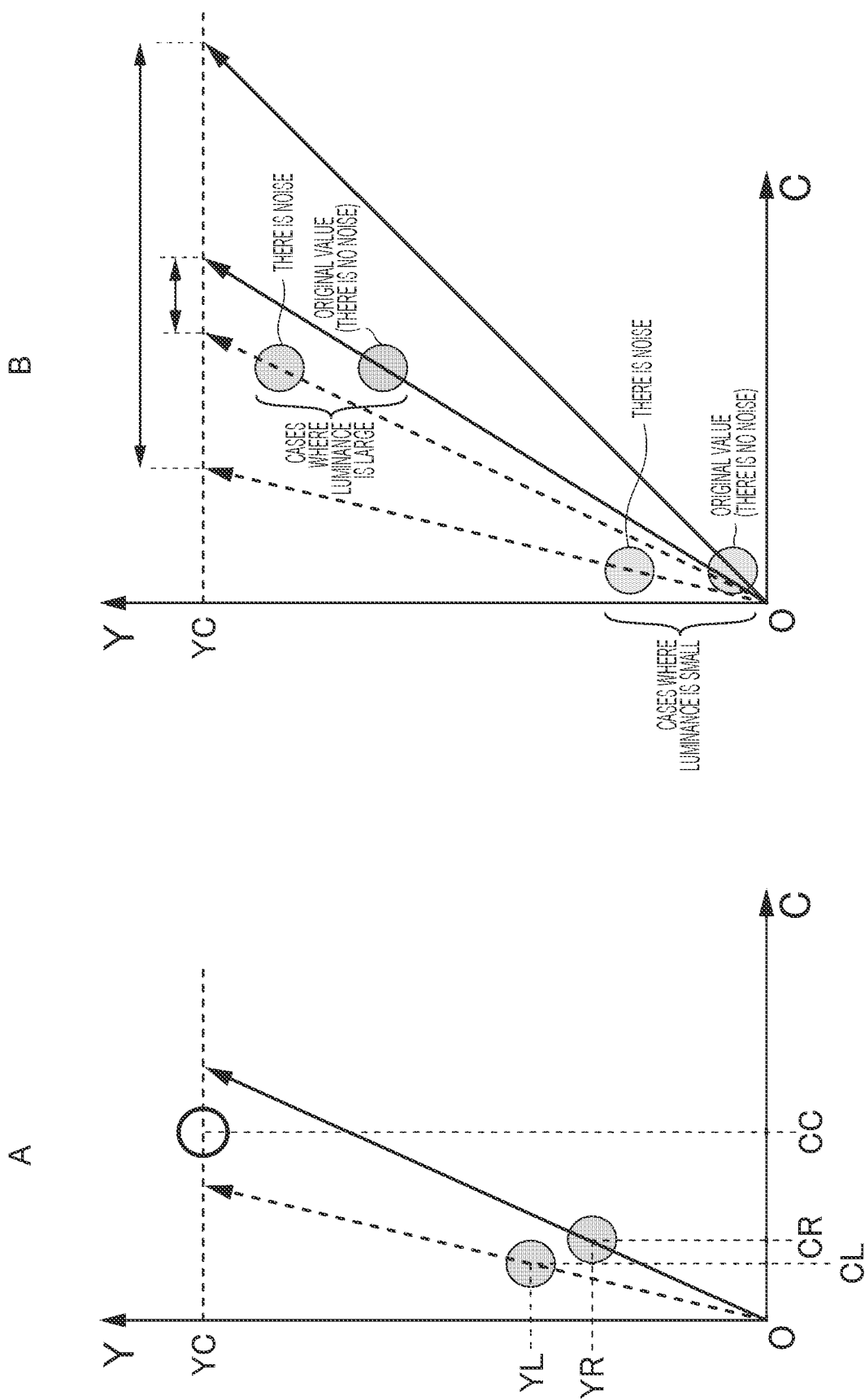
FIG. 5 is an explanatory diagram of necessity of an offset value Δ.

For example, a case is considered where the luminance YC at the interpolation target pixel position, the luminance YL and the color difference CL at the first neighboring pixel position, and the luminance YR and the color difference CR at the second neighboring pixel position are values illustrated in FIG. 5A. In this case, since both the first neighboring pixel position and the second neighboring pixel position have small luminance, are dark, and are closer to a vertical axis indicating the color difference C=0, the color is close to black. On the other hand, since the luminance YC is large, the interpolation target pixel position is brighter than the first neighboring pixel position and the second neighboring pixel position.

In this state, if there is noise in either the color difference CL at the first neighboring pixel position or the color difference CR at the second neighboring pixel position, and interpolation of the interpolation target pixel position is performed by using the first neighboring pixel position and the second neighboring pixel position, the color difference with noise is amplified by the luminance YC, and the noise becomes conspicuous. Therefore, by using the offset value $\Delta$, it is prevented that the color difference CL and/or the color difference CR becomes too large in a case where the luminance YL and/or the luminance YR is large or small, and as a result, noise is amplified in the color difference CC at the interpolation target pixel position. Although FIG. 5A illustrates noise of the color difference, in a case where there is noise in the luminance as illustrated in FIG. 5B, even if a noise amount of the luminance is the same in a case where the luminance is small and large, a calculated noise amount becomes large in a case where the luminance is small. Therefore, the offset value Δ is also effective for preventing noise of the luminance from being amplified.

The offset value Δ may be defined as a constant with respect to the luminance Y as illustrated in FIG. 6A.

In addition, the offset value Δ can be defined as a function of the luminance YC by Equation 2 below.

$$\Delta = F(\min(YL, YC, YR))$$ [Equation 2]

In Equation 2, the offset value Δ is determined on the basis of minimum values of the luminance YC, the luminance YL, and the luminance YR, and a relationship between the luminance Y and the offset value Δ can be represented as illustrated in FIG. 6B, for example. Note that the relationship between the luminance Y and the offset value Δ illustrated in FIG. 6B is merely an example, and the relationship between the luminance Y and the offset value Δ may be linear or non-linear.

Since the offset value Δ is required when the luminance Y is small, in other words, the offset value Δ exerts an effect when the luminance Y is small, the offset value Δ may be defined as a function of Y. When Y is small, the offset value Δ has a value, the offset value Δ decreases as Y increases, and when Y increases to some extent, the offset value Δ may be set to 0.

Furthermore, the value of the offset value Δ may be determined in accordance with the function and setting of the imaging device 10.

Note that the offset value Δ is not essential in the interpolation processing, but is preferably used to obtain a better interpolation result.

FIG. 7 schematically illustrates processing of calculating the color difference CC of the interpolation target pixel position by Equation 1 and generating the interpolation target color difference pixel, with a vertical axis (Y axis) as the luminance and a horizontal axis (C axis) as the color difference. FIG. 7A is a first example, and FIG. 7B is a second example.

An average of a value of a color difference C at an intersection of a straight line LL connecting a point shifted from the origin on the Y axis by the offset value Δ and a point corresponding to the color difference CL and the luminance YL at the first neighboring pixel position and a straight line of Y=YC (two-dot chain line) and a value of a color difference C at an intersection of a straight line RR connecting a point shifted from the origin on the Y axis by the offset value Δ and a point corresponding to the color difference CR and the luminance YR at the second neighboring pixel position and a straight line of Y=YC (two-dot chain line) is defined as the color difference CC at the interpolation target pixel position.

Note that, for example, as indicated in Equation 3 below, the color difference CC of the interpolation target pixel position can be calculated by defining different individual offset values Δ for the luminance YC, the luminance YL, and the luminance YR, respectively.

$$CC = \left( \frac{Y_C + \Delta(Y_C)}{Y_L + \Delta(Y_L)} \times C_L + \frac{Y_C + \Delta(Y_C)}{Y_R + \Delta(Y_R)} \times C_R \right) / 2$$ [Equation 3]

When the positive correlation between the luminance Y and the color difference C is a proportional relationship, an average value of a multiplication value of a ratio of the luminance YC at the interpolation target pixel position to the luminance YL at the first neighboring pixel position and the color difference CL at the first neighboring pixel position, and a multiplication value of a ratio of the luminance YC at the interpolation target pixel position to the luminance YR at the second neighboring pixel position and the color difference CR at the second neighboring pixel position is calculated as the color difference CC at the interpolation target pixel position.

Note that, since the color difference pixels are decimated only in a horizontal direction in YC 4:2:2, in a case where the image data as a processing target is YC 4:2:2, the luminance at the neighboring pixel positions located on the right and left of the interpolation target pixel position is used. On the other hand, since the color difference pixels are decimated both in the horizontal direction and a vertical direction in YC 4:2:0, in a case where the image data as a processing target is YC 4:2:0, the luminance at the neighboring pixel positions located on the right and left and the luminance at the neighboring pixel positions located on upper and lower sides are used.

As described above, the interpolation processing according to the first embodiment of the present technology is performed. Note that the above description is a case where there are two neighboring pixel positions. In a case where there is one neighboring pixel position, the value of the color difference of the neighboring pixel position is the color difference CC at the interpolation target pixel position. Furthermore, in a case where there are three neighboring pixel positions, an average of values of the three color differences is the color difference CC at the interpolation target pixel position. Equations 1, 2, and 3 in Example 1 are all equations in a case where the number of neighboring pixel positions is two. In a case where the number of neighboring pixel positions is three or more, any number of neighboring pixel positions can be applied by increasing a term of each equation in accordance with the number.

2. Second Embodiment

[2-1. Configuration of Information Processing Apparatus 200]

Next, a second embodiment will be described. Note that the configurations of the imaging device 10 and the developing device 20 are similar to the configurations in the first embodiment, and thus the description thereof will be omitted.

Figure 8:
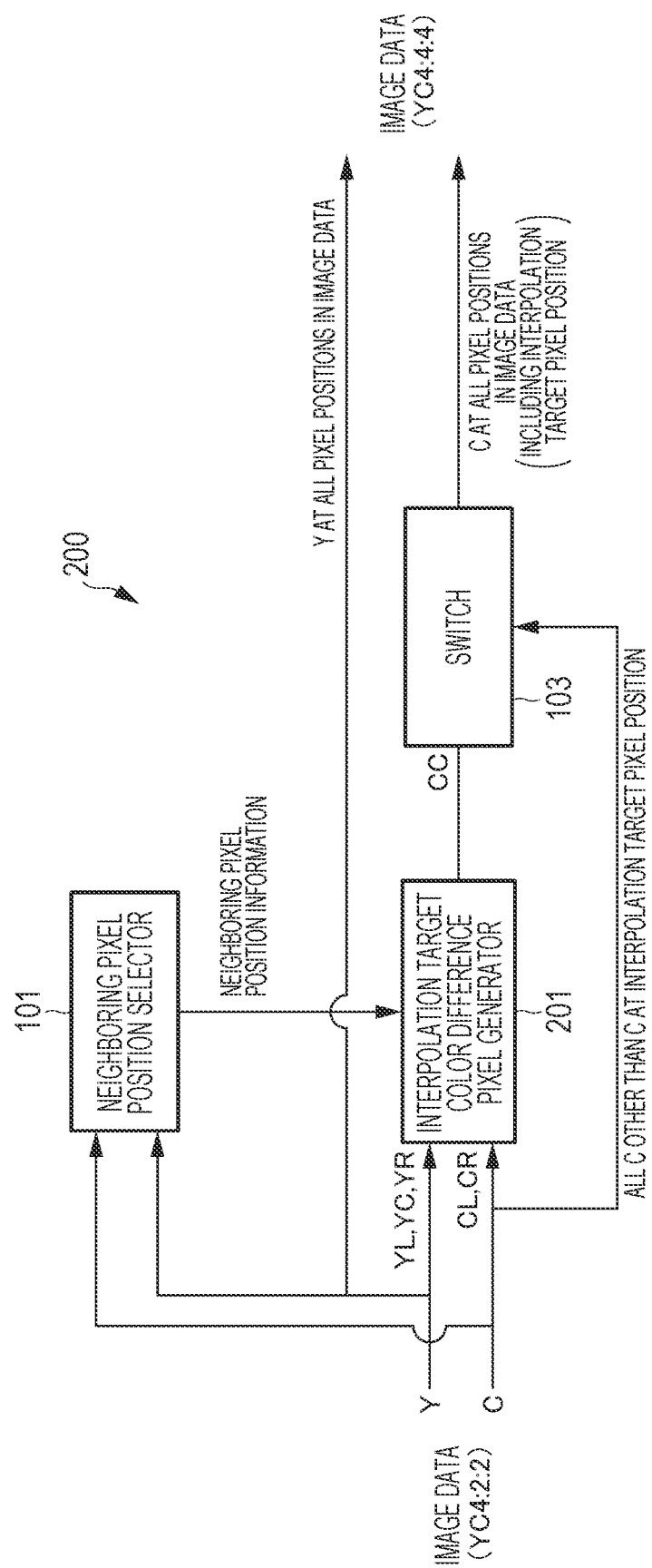
FIG. 8 is a block diagram illustrating a configuration of an information processing apparatus 200 according to a second embodiment.

As illustrated in FIG. 8, an information processing apparatus 200 includes the neighboring pixel position selector 101 and the switch 103 as in the first embodiment, and in the second embodiment, processing in the interpolation target color difference pixel generator 201 is different from processing in the interpolation target color difference pixel generator 102 in the first embodiment. The interpolation target color difference pixel generator 201 generates an interpolation target color difference pixel on the basis of the fact that there is a correlation that the color difference takes a close value in a case where the value of the luminance is a close value between the magnitudes of the luminance and the color difference constituting the image data. By generating the interpolation target color difference pixel at the interpolation target pixel position, interpolation of the decimated pixels is performed.

In a similar manner to the description in the first embodiment, it is assumed that decimated image data of YC 4:2:2 is input as a processing target in the second embodiment. Furthermore, since the color differences of all the decimated interpolation target pixel positions are interpolated by the information processing apparatus 200, the image data of YC 4:4:4 is output from the information processing apparatus 200.

The information processing apparatus 200 is configured as described above. The information processing apparatus 200 is similar to the information processing apparatus according to the first embodiment in that the information processing apparatus 200 may be configured by a program, may be configured as a dedicated apparatus by hardware, and the like.

[2-2. Processing by Information Processing Apparatus 200]

Processing in the information processing apparatus 200 will be described. Note that processing in the neighboring pixel position selector 101 and the switch 103 is similar to the processing in the first embodiment.

In a similar manner to the first embodiment, the second embodiment will be described by using the color difference CC and the luminance YC at the interpolation target pixel position, the color difference CL and the luminance YL at the first neighboring pixel position, and the color difference CR and the luminance YR at the second neighboring pixel position.

In the second embodiment, the interpolation target color difference pixel is generated by a weighted average using a luminance difference between the luminance YC at the interpolation target pixel position and the luminance YL at the first neighboring pixel position and a luminance difference between the luminance YC and the luminance YR at the second neighboring pixel position, and interpolation is performed. Here, the weighted average is used by utilizing the fact that the value of the color difference at the interpolation target pixel position takes a value close to the color difference at the neighboring pixel position having a value of the luminance closer to the value of the luminance at the interpolation target pixel position. The luminance difference corresponds to the "relationship between the value of the luminance pixel at the interpolation target pixel position and the value of the luminance pixel at the neighboring pixel position".

First, a first method of processing in the interpolation target color difference pixel generator 201 will be described. In the first method, the luminance difference between the luminance YC at the interpolation target pixel position and the luminance YL at the first neighboring pixel position and the luminance difference between the luminance YC at the interpolation target pixel position and the luminance YR at the second neighboring pixel position are compared with one threshold th. Then, interpolation processing is performed in accordance with whether or not the luminance difference is greater than or equal to the threshold th.

FIGS. 9A to 9G are diagrams illustrating a relationship between the luminance YC at the interpolation target pixel position, the luminance YL at the first neighboring pixel position, and the luminance YR at the second neighboring pixel position, with the vertical direction as the magnitude of the luminance.

Figure 9:
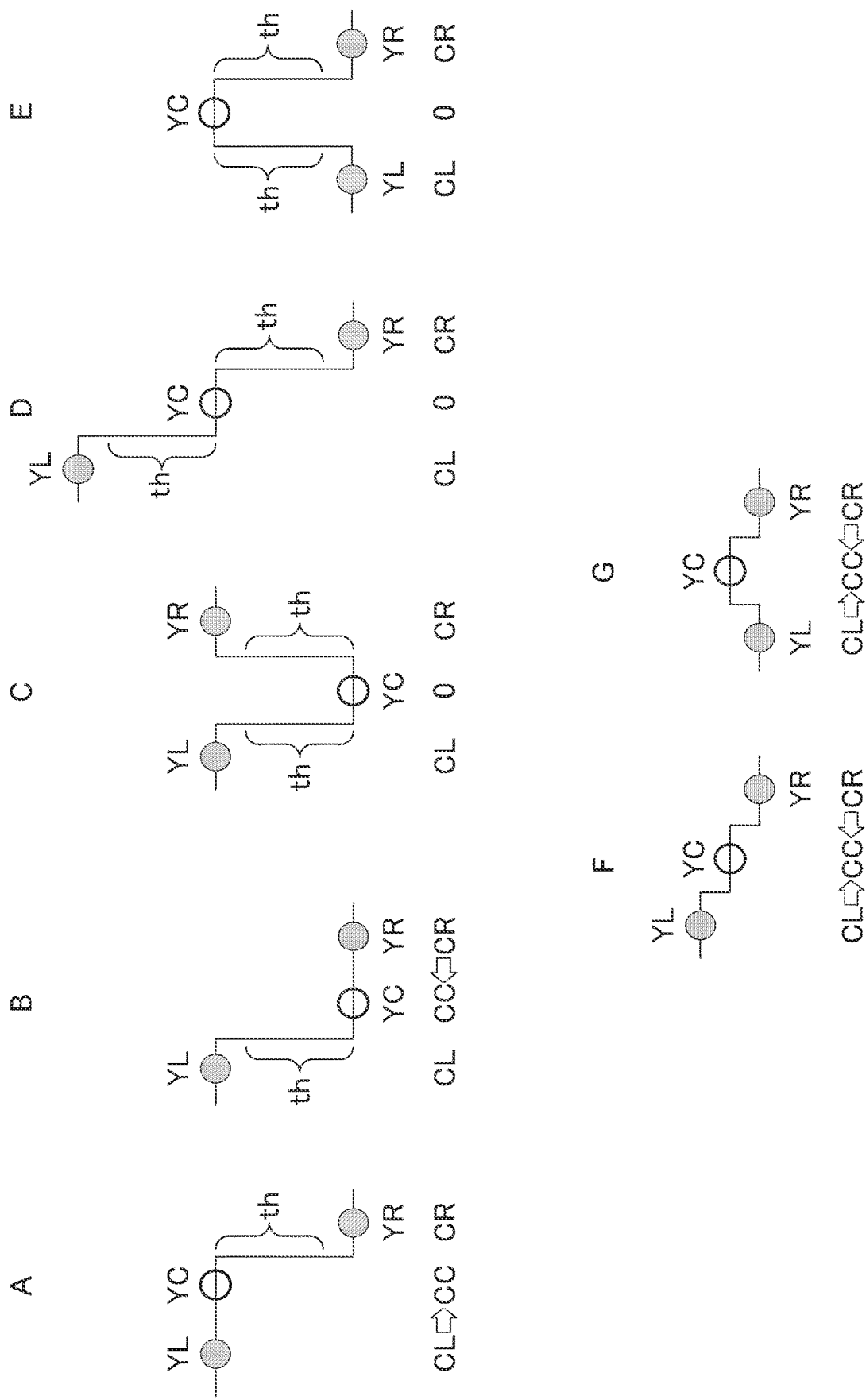
FIG. 9 is an explanatory diagram of a first method of interpolation processing according to the second embodiment.

First, as illustrated in FIG. 9A, a case will be considered in which the luminance difference between the luminance YC at the interpolation target pixel position and the luminance YL at the first neighboring pixel position is less than or equal to the threshold th, and the luminance difference between the luminance YC at the interpolation target pixel position and the luminance YR at a second neighboring pixel is greater than or equal to the threshold th. In this case, the color difference CL at the first neighboring pixel position where the luminance difference is less than or equal to the threshold th is used, the color difference CR at the second neighboring pixel is not used, and the color difference CL is set as the color difference CC at the interpolation target pixel position (color difference CC=color difference CL).

FIG. 10A schematically illustrates the interpolation processing in the case of FIG. 9A with the vertical axis (Y axis) as the luminance and the horizontal axis (C axis) as the color difference.

As a result of performing interpolation target color difference pixel generation in the case of FIG. 9A, as shown in FIG. 10A, the color difference CC at the interpolation target pixel position has the same value as the color difference CL at the first neighboring pixel position, and is located on the axis of the color difference CL.

In addition, as illustrated in FIG. 9B, a case will be considered in which the luminance difference between the luminance YC at the interpolation target pixel position and the luminance YL at the first neighboring pixel position is greater than or equal to the threshold th, and the luminance difference between the luminance YC at the interpolation target pixel position and the luminance YR at a second neighboring pixel is less than or equal to the threshold th. In this case, the color difference CR at the second neighboring pixel position where the luminance difference is less than or equal to the threshold th is used, the color difference CL of the first neighboring pixel is not used, and the color difference CR is set as the color difference CC at the interpolation target pixel position (color difference CC=color difference CR).

Note that, FIG. 9A illustrates that the luminance YL at the first neighboring pixel position and the luminance YC at the interpolation target pixel position used for interpolation are the same luminance value, but the luminance YL and the luminance YC are not necessarily the same, and the luminance difference may be less than or equal to the threshold th. The luminance YR at the second neighboring pixel position and the luminance YC at the interpolation target pixel position in FIG. 9B are set in a similar manner.

As illustrated in FIGS. 9A and 9B, in a case where the luminance difference between the interpolation target pixel position and the first neighboring pixel position and/or the second neighboring pixel position is greater than or equal to the threshold th, it is considered that there is an edge between the interpolation target pixel position and the first neighboring pixel position and/or the second neighboring pixel position, and different subjects are configured. It is therefore better not to use the luminance difference for interpolation.

Next, as illustrated in FIG. 9C, a case will be considered in which both the luminance difference between the luminance YC at the interpolation target pixel position and the luminance YL at the first neighboring pixel position and the luminance difference between the luminance YC at the interpolation target pixel position and the luminance YR at the second neighboring pixel position are greater than or equal to the threshold th. In this case, neither the color difference CL at the first neighboring pixel position nor the color difference CR at the second neighboring pixel position is used, and the color difference CC at the interpolation target pixel position is set to 0 (achromatic color).

Note that the case where both the luminance difference between the luminance YC and the luminance YL and the luminance YC and the luminance YR are greater than or equal to the threshold th may be a case where the luminance YL and the luminance YR are either larger or smaller than the luminance YC as illustrated in FIGS. 9D and 9E.

The generation of the interpolation target color difference pixel in this case is schematically represented as in FIG. 10B, where the vertical axis (Y axis) is the luminance and the horizontal axis (C axis) is the color difference. The color difference CC of the interpolation target pixel position is 0.

Next, as illustrated in FIG. 9F, a case will be considered in which both the luminance difference between the luminance YC at the interpolation target pixel position and the luminance YL at the first neighboring pixel position and the luminance difference between the luminance YC at the interpolation target pixel position and the luminance YR at the second neighboring pixel position are less than or equal to the threshold th. In this case, a weighted average of the color difference CL and the color difference CR is set as the color difference CC at the interpolation target pixel position by using Equation 4 below.

$$CC=(CL+CR)/2 \quad \text{[Equation 4]}$$

This is because, since the luminance difference is small, even if interpolation is performed by using only the color difference CL and the color difference CR without using the luminance, it is considered that a deviation between the color difference CL and the color difference CR and the color difference CC at the interpolation target pixel position becomes small.

Note that the case where both the luminance difference between the luminance YC at the interpolation target pixel position and the luminance YL at the first neighboring pixel position and the luminance YC at the interpolation target pixel position and the luminance YR at the second neighboring pixel position are less than or equal to the threshold th may be the case where the luminance YL and the luminance YR are either larger or smaller than the luminance YC as illustrated in FIGS. 9F and 9G.

The generation of the interpolation target color difference pixel in this case is schematically represented in FIG. 10C, where the vertical axis (Y axis) is the luminance and the horizontal axis (C axis) is the color difference. In a case where the luminance YL and the color difference CL at the first neighboring pixel position, the luminance YR and the color difference CR at the second neighboring pixel position, and the luminance YC at the interpolation target pixel position are values illustrated in FIG. 10C, the color difference CC at the interpolation target pixel position is a weighted average of the color difference CL at the first neighboring pixel position and the color difference CR at the second neighboring pixel position, and the color difference CC is located at an average value of the color difference CL and the color difference CR.

Figure 10:
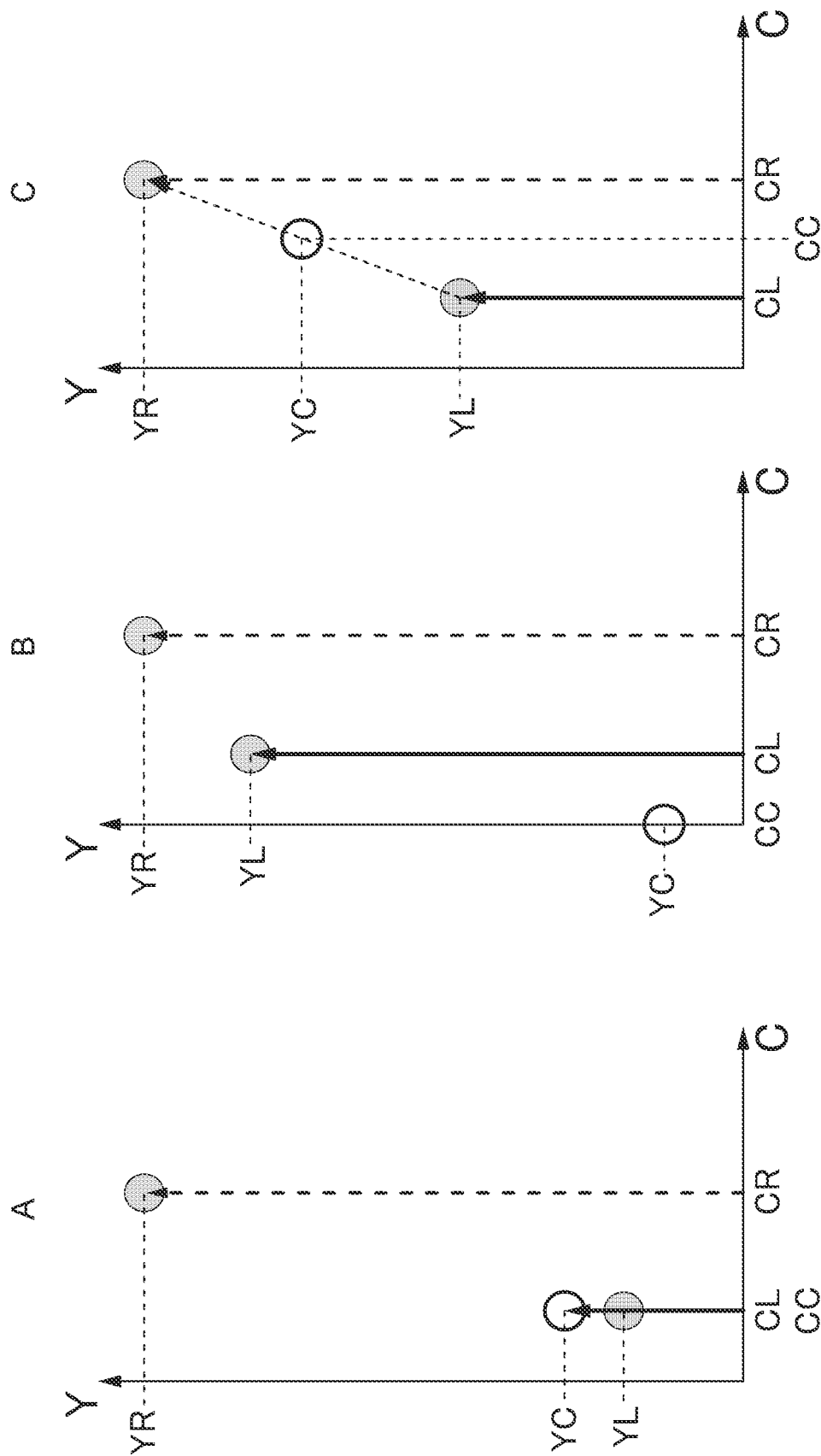
FIG. 10 is a diagram schematically illustrating the first method of the interpolation processing according to the second embodiment.

Note that the values of the luminance YL and the color difference CL at the first neighboring pixel position, the luminance YR and the color difference YR at the second neighboring pixel position, and the luminance YC at the interpolation target pixel position in FIG. 10 are merely examples, and the present technology is not limited to these values.

Next, a second method of processing in the interpolation target color difference pixel generator 102 will be described. In the second method, a plurality of thresholds for the luminance difference is used. Here, an example will be described in which two thresholds of a first threshold th1 and a second threshold th2 are used.

A relationship between the luminance difference, the thresholds, and the color difference CC is illustrated in a table of FIG. 11. It is assumed that the first threshold th1 and the second threshold th2 have a relationship of "th2<th1". In addition, the difference between the luminance YC and the luminance YL is denoted by (DL=abs(YC−YL), and the difference between the luminance YC and the luminance YR is denoted by DR (DR=abs(YC−YR).

Furthermore, by using DL, DR, the first threshold th1, and the second threshold th2, α and @ are defined as in Equations 5 and 6 below.

$$\alpha=(DL-th2)/(th1-th2) \quad \text{[Equation 5]}$$

$$\beta=(DR-th2)/(th1-th2) \quad \text{[Equation 6]}$$

Note that α and β are clipped to $0\leq\alpha\leq1$ and $0\leq\beta\leq1$ in Equations 5 and 6.

In a case where DL≤th2 (where α=0) and DR≤th2 (where β=0), the color difference CC at the interpolation target pixel position is calculated by an equation shown in (1) of the table in FIG. 11.

In addition, in a case where th2≤DL≤th1 (where $0\leq\alpha\leq1$) and DR≤th2 (where β=0), the color difference CC at the interpolation target pixel position is calculated by an equation shown in (2) in the table of FIG. 11.

In addition, in a case where th1≤DL (where α=1) and DR≤th2 (where β=0), the color difference CR at the second neighboring pixel position is set as the color difference CC at the interpolation target pixel position as illustrated in (3) in the table of FIG. 11.

In addition, in a case where DL≤th2 (where α=0) and th2≤DR≤th1 (where $0\leq\beta\leq1$), the color difference CC at the interpolation target pixel position is calculated by an equation shown in (4) in the table of FIG. 11.

In addition, in a case where th2≤DL≤th1 (where $0\leq\alpha\leq1$) and th2≤DR≤th1 (where $0\leq\beta\leq1$), the color difference CC at the interpolation target pixel position is calculated by an equation shown in (5) in the table of FIG. 11.

In addition, in a case where th1≤DL (where α=1) and th2≤DR≤th1 (where $0\leq\beta\leq1$), the color difference CC at the interpolation target pixel position is calculated by an equation shown in (6) of the table in FIG. 11.

In addition, in a case where DL≤th2 (where α=0) and th1≤DR (where β=1), the color difference CL at the first neighboring pixel position is set as the color difference CC at the interpolation target pixel position as shown in (7) of the table in FIG. 11.

In addition, in a case where th2≤DL≤th1 (where $0\leq\alpha\leq1$) and th1≤DR (where β=1), the color difference CC at the interpolation target pixel position is calculated by an equation shown in (8) of the table in FIG. 11.

Furthermore, in a case where th1≤DL (where α=1) and th1≤DR (where β=1), the color difference CC at the interpolation target pixel position is set to 0 (achromatic color) as shown in (8) of the table in FIG. 11.

Note that all of (1) to (9) shown in the table of FIG. 11 can be represented by Equation 7 below.

$$\begin{aligned} CC &= (A-B)CL + (A+B)CR \\ &= A^*(CL+CR) - B^*(CL-CR) \text{ where} \\ CC &= \{(1-\alpha)(1+\beta)CL + (1+\alpha)(1-\beta)CR\}/2 \\ A &= (1-\alpha\beta)/2, B = (\alpha-\beta)/2 \end{aligned} \quad \text{[Equation 7]}$$

Note that, since the color difference pixels are decimated only in the horizontal direction in YC 4:2:2, in a case where the image data as a processing target is YC 4:2:2, comparison is performed with the luminance at the neighboring pixel positions located on the right and left of the interpolation target pixel position. On the other hand, since the color difference pixels are decimated both in the horizontal direction and the vertical direction in YC 4:2:0, in a case where the image data as a processing target is YC 4:2:0, comparison is performed with the luminance at the neighboring pixel positions located on the right and left and the luminance at the neighboring pixel positions located on the upper and lower sides.

As described above, the processing according to the second embodiment is performed.

3. Third Embodiment

[3-1. Configuration of Information Processing Apparatus 300]

Figure 12:
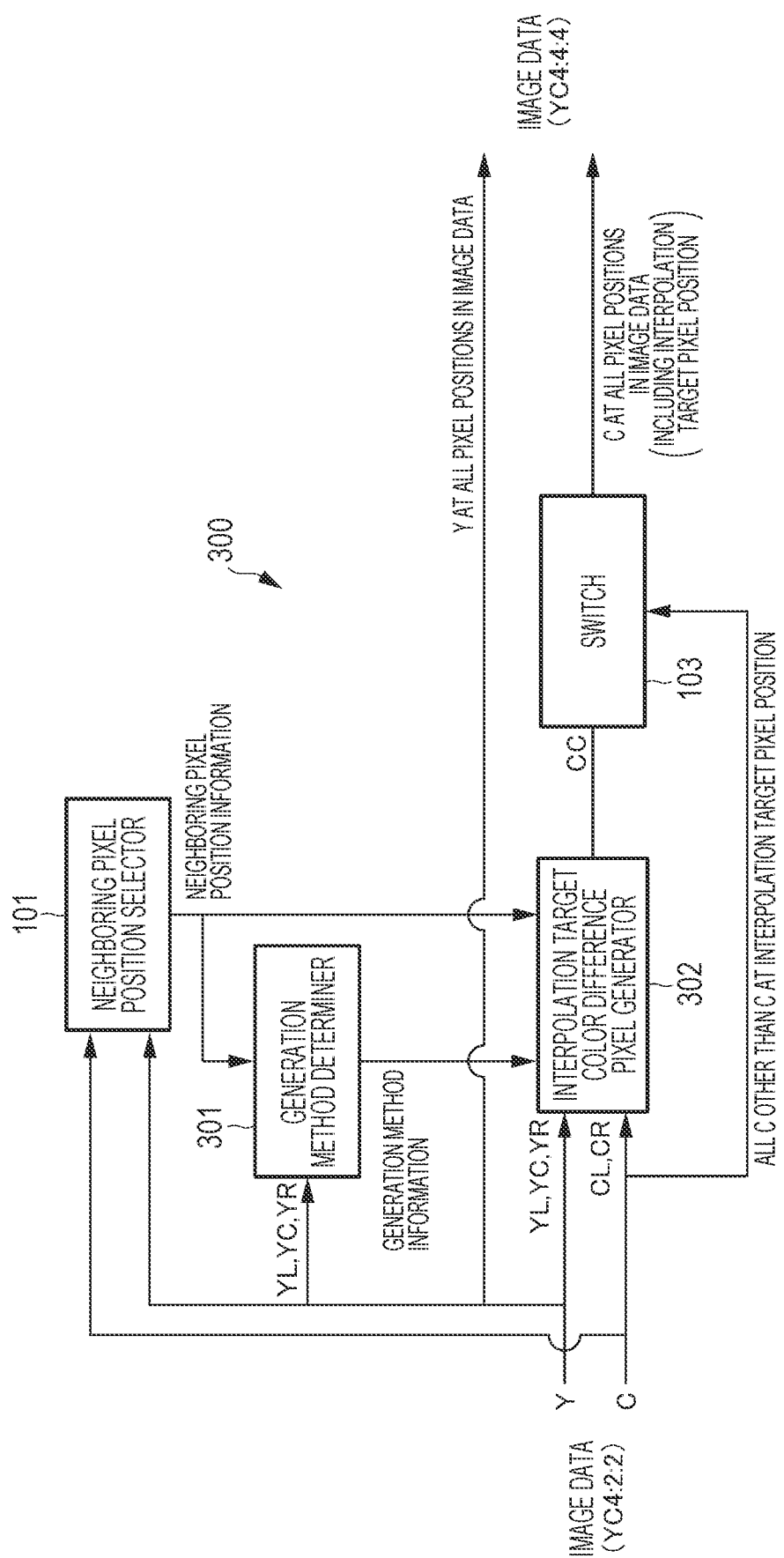
FIG. 12 is a block diagram illustrating a configuration of an information processing apparatus 300 according to a third embodiment.

Next, a configuration of an information processing apparatus 300 according to a third embodiment will be described with reference to FIG. 12. Note that the configurations of the imaging device 10 and the developing device 20 are similar to the configurations in the first embodiment, and thus the description thereof will be omitted.

The third embodiment is different from the first and second embodiments in that a generation method determiner 301 is included, and an interpolation target color difference pixel generator 302 can perform the processing in the first and second embodiments. The neighboring pixel position selector 101 and the switch 103 are similar to those in the first embodiment.

The generation method determiner 301 determines which generation method of an interpolation target color difference pixel of the first embodiment or the second embodiment is executed by the interpolation target color difference pixel generator 302 on the basis of luminance information of the image data as a processing target. The information indicating the determined generation method is supplied from the generation method determiner 301 to the interpolation target color difference pixel generator 302. Note that, since the generation method determiner 301 determines the generation method by using the luminance at the first neighboring pixel position and the second neighboring pixel position, neighboring pixel position information is supplied from the neighboring pixel position selector 101.

The information processing apparatus 300 is configured as described above. The information processing apparatus 300 is similar to the information processing apparatus according to the first embodiment in that the information processing apparatus 300 may be configured by a program, may be configured as a dedicated apparatus by hardware, and the like.

[3-2. Processing by Information Processing Apparatus 300]

Next, the determination of a generation method of the interpolation target color difference pixel by the generation method determiner 301 will be described.

In a similar manner to the first embodiment, the third embodiment will be described by using the color difference CC and the luminance YC at the interpolation target pixel position, the color difference CL and the luminance YL at the first neighboring pixel position, and the color difference CR and the luminance YR at the second neighboring pixel position.

The generation method determiner 301 compares the luminance difference between the luminance YC at the interpolation target pixel position included in the image data as a processing target and the luminance difference between the luminance YL at the first neighboring pixel position and the luminance YR at the second neighboring pixel position with the threshold th to determine a generation method of the interpolation target color difference pixel.

As illustrated in FIGS. 13A to 13E, in a case where the luminance difference between the luminance YC at the interpolation target pixel position and the luminance YL at the first neighboring pixel position and/or the luminance YR at the second neighboring pixel position is greater than or equal to the threshold th, the generation method of the interpolation target color difference pixel is determined to be the method according to the second embodiment. The method according to the second embodiment is a method of generating an interpolation target color difference pixel on the basis of a difference (luminance difference) between the value of the luminance pixel at the interpolation target pixel position and the value of the luminance pixel at the neighboring pixel position.

Figure 13:
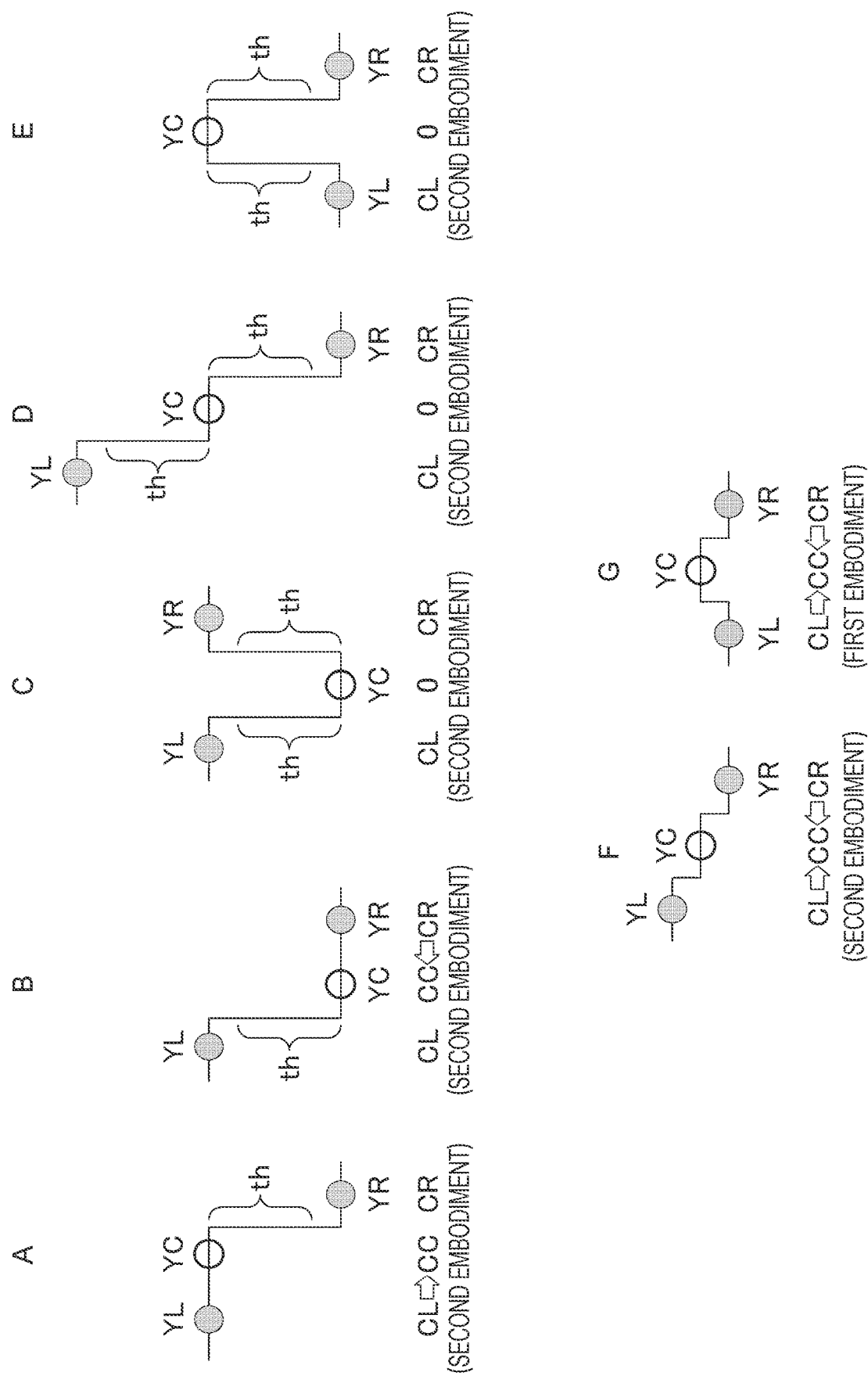
FIG. 13 is an explanatory diagram of interpolation processing according to the third embodiment.

Specifically, in the case of FIG. 13A, the color difference CL at the first neighboring pixel position where the luminance difference is less than or equal to the threshold th is set as the color difference CC at the interpolation target pixel position. In addition, in the case of FIG. 13B, the color difference CR at the second neighboring pixel position where the luminance difference is less than or equal to the threshold th is set as the color difference CC at the interpolation target pixel position.

Furthermore, in the cases of FIGS. 13C, 13D, and 13E, the color difference CL and the color difference CR are not used, and the color difference CC at the interpolation target pixel position is set to 0 (achromatic color). This means that in a case where the luminance difference is large, the color difference at the neighboring pixel position is not used for interpolation. This is because, in a case where the luminance difference is large, it is considered that there is an edge between the interpolation target pixel position and the first neighboring pixel position and/or the second neighboring pixel position, and different subjects are configured.

In addition, FIGS. 13F and 13G illustrate a case where both the luminance difference between the luminance YC and the luminance YL and the luminance difference between the luminance YC and the luminance YR are less than or equal to the threshold th. In this case, it is confirmed whether or not a magnitude relationship between the luminance YL, the luminance YC, and the luminance YR is a relationship of monotonous increase (decrease). Then, as illustrated in FIG. 13F, in a case of monotonous increase (decrease), the generation method of the interpolation target color difference pixel is determined to be a similar method to the method in FIG. 9F according to the second embodiment, and the weighted average of the color difference CL and the color difference CR is set as the color difference CC at the interpolation target pixel position by using Equation 4 described above.

This monotonous increase (decrease) corresponds to "a case where the value of the luminance pixel having a maximum value and a minimum value of the value of the luminance pixel at the interpolation target pixel position and the value of the luminance pixel at the neighboring pixel position is the value of the luminance pixel at any neighboring pixel position" in the claims.

On the other hand, as illustrated in FIG. 13G, in a case where the magnitude relationship between the luminance YL, the luminance YC, and the luminance YR is not monotonous increase (decrease), the generation method of the interpolation target color difference pixel is determined to be the method according to the first embodiment.

Note that in FIG. 13D, the luminance YL, the luminance YC, and the luminance YR can also be said to have a relationship of monotonous increase (decrease), but since the luminance difference is large, the color difference CL and the color difference CR is not used, and the color difference CC at the interpolation target pixel position is set to 0 (achromatic color).

This is because, in the case of monotonous increase (decrease), the luminance at the interpolation target pixel position is sandwiched between the luminance at the neighboring pixel positions on both sides, and an internal division point is calculated by using the method according to the second embodiment, and accuracy is increased, whereas in a case where the relationship between the luminance CC, the luminance CL, and the luminance CR is concave (or convex) rather than monotonous increase (decrease), the accuracy is higher in the method according to the first embodiment.

Note that, in a case where the luminance difference between the luminance YC and the luminance YL and the luminance difference between the luminance YC and the luminance YR are less than or equal to the threshold, the generation method of the interpolation target color difference pixel may be the method according to the second embodiment regardless of whether or not the luminance difference has a relationship of monotonous increase (decrease).

As described above, the processing according to the third embodiment is performed.

The present technology enables interpolation of decimated color difference pixels without degrading an image quality of an image due to coloring or the like. As a result, it is possible to obtain image data in which the luminance and color difference are uniform in all pixels after the decimation processing is performed.

Conventionally, in order not to cause image quality degradation by interpolation, it has been necessary to perform white clip processing before interpolation processing by generating an interpolation target color difference pixel. However, it is not necessary to perform the white clip processing before the interpolation by the generation of the interpolation target color difference pixel of the present technology, and it is also possible to perform the decimation processing without performing the white clip processing in the imaging device 10 and to perform the white clip processing after performing the interpolation processing in the developing device 20.

In addition, it is possible to reduce the size of the image data by the decimation processing to shorten the transfer time from the imaging device 10 to the developing device 20, and to obtain a high-quality image by performing the interpolation processing before development processing.

4. Modifications

Although the embodiments of the present technology have been specifically described above, the present technology is not limited to the above-described embodiments, and various modifications based on the technical idea of the present technology are possible.

Figure 14:
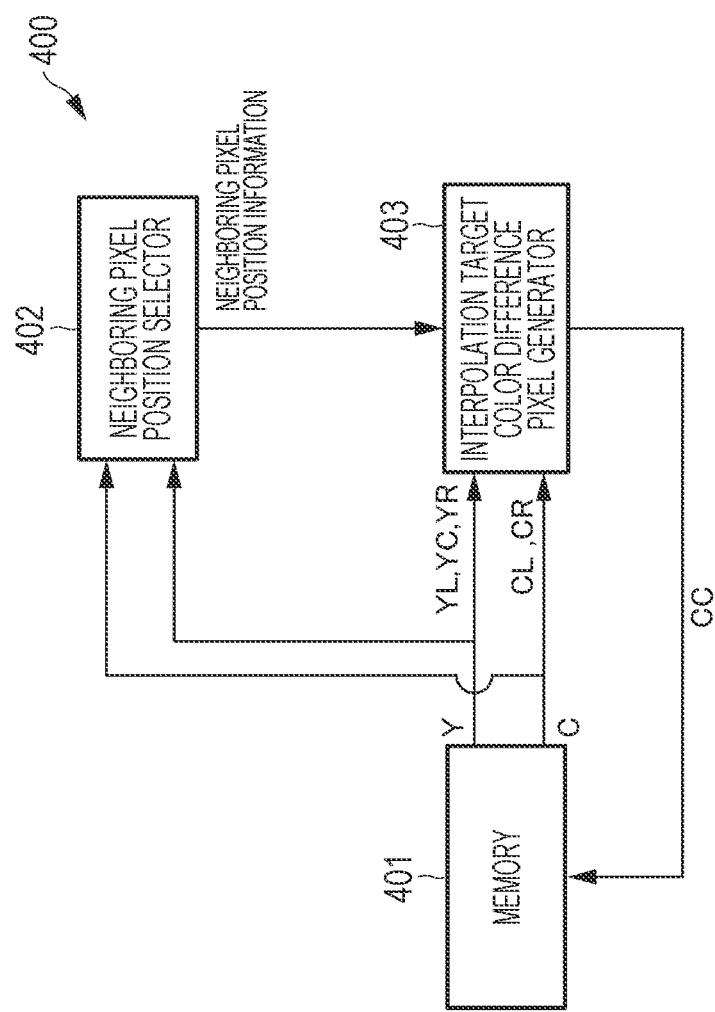
FIG. 14 is a block diagram illustrating a configuration of an information processing apparatus 400 according to a modification.

FIG. 14 is a block diagram illustrating a configuration of an information processing apparatus 400 according to a modification. The information processing apparatus 400 includes a memory 401, a neighboring pixel position selector 402, and an interpolation target color difference pixel generator 403. The neighboring pixel position selector 402 and the interpolation target color difference pixel generator 403 are similar to the neighboring pixel position selector 101 and the interpolation target color difference pixel generator 102 according to the first embodiment.

The memory 401 stores image data (for example, YC 4:2:2) as a processing target subjected to decimation processing, and a luminance signal and a color difference signal are supplied from the memory 401 to the neighboring pixel position selector 402 and the interpolation target color difference pixel generator 403.

After generating the interpolation target color difference pixel, the interpolation target color difference pixel generator 403 supplies the interpolation target color difference pixel to the memory 401. As a result, the image data of YC 4:4:4 in which the color difference is interpolated is stored in the memory 401. This modification is applicable to any of the first to third embodiments.

Figure 15:
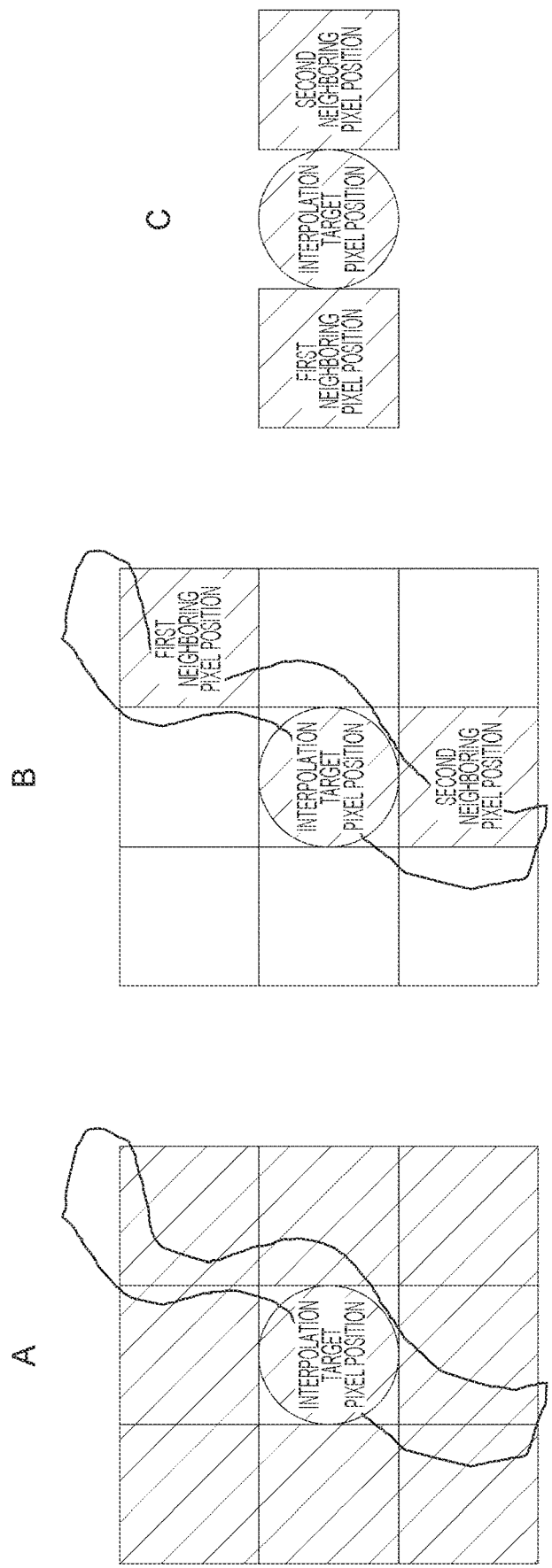
FIG. 15 is an explanatory diagram of neighboring pixel position selection according to a modification.

FIG. 15 is a diagram illustrating a modification of neighboring pixel position selection by the neighboring pixel position selector 101. As illustrated in FIG. 15B, two neighboring pixel positions may be selected from among a plurality of pixel positions (for example, eight pixel positions in a 3×3 frame) existing around the interpolation target pixel position as illustrated in FIG. 15A on the basis of the correlation of the luminance and the color. Then, as illustrated in FIG. 15C, an interpolation target color difference pixel at the interpolation target pixel position is generated by using the neighboring pixel position, and interpolation processing is performed.

FIG. 16 is a diagram illustrating a configuration of pixel arrangement constituting image data. A configuration example of YC 4:4:4 in the image data is illustrated in FIG. 16A. For example, when the color difference pixels are decimated in the horizontal direction from YC 4:4:4, YC 4:2:2 is obtained, and pixel arrangement as illustrated in FIG. 16B is obtained. Furthermore, for example, when the color difference signal is decimated in the vertical direction, YC 4:2:0 is obtained, and pixel arrangement as illustrated in FIG. 16C1 is obtained. Such pixel arrangement is often employed in digital image data and digital video data.

There is also an example in which there is a phase difference between the luminance signal and the color difference signal. In an example illustrated in FIG. 16B2, two pixel positions surrounded by a broken line are set as one combination, luminance corresponding to a central position of the two pixel positions indicated as P in FIG. 16B2 is generated from each luminance at the two pixel positions, and the interpolation target color difference pixel at the interpolation target pixel position is generated by applying the present technology. In an example illustrated in FIG. 16C2, four pixel positions surrounded by a broken line are set as one combination, luminance corresponding to a central position of the four pixel positions indicated as P in FIG. 16C2 is generated from each luminance at the four pixel positions, and the interpolation target color difference pixel at the interpolation target pixel position is generated by applying the present technology.

Note that the present technology can have the following configurations.

(1) An information processing apparatus includes an interpolation target color difference pixel generator that generates, on the basis of a relationship between a luminance pixel at an interpolation target pixel position that is a pixel position at which a first color difference pixel does not exist and the luminance pixel at at least one neighboring pixel position of a plurality of pixel positions near the interpolation target pixel position in image data, an interpolation target color difference pixel corresponding to the first color difference pixel at the interpolation target pixel position, in which the image data is generated on the basis of three primary color pixels that can include a value greater than a predetermined white clip value, the image data having a number of the luminance pixels larger than a number of the first color difference pixels and a number of second color difference pixels.

(2) In the information processing apparatus according to (1), the interpolation target color difference pixel generator generates the interpolation target color difference pixel by using the first color difference pixel at the neighboring pixel position.

(3) In the information processing apparatus according to (2), the interpolation target color difference pixel generator calculates a value of the interpolation target color difference pixel from a value of the luminance pixel at the interpolation target pixel position, a value of the luminance pixel at the neighboring pixel position, and a value of the first color difference pixel at the neighboring pixel position.

(4) In the information processing apparatus according to (2) or (3), the interpolation target color difference pixel generator generates the interpolation target color difference pixel on the basis of a relationship between a value of the luminance pixel at the interpolation target pixel position and a value of the luminance pixel at the neighboring pixel position.

(5) In the information processing apparatus according to (4), the interpolation target color difference pixel generator generates the interpolation target color difference pixel by using a positive correlation between a value of the luminance pixel and a magnitude of a value of the first color difference pixel on the basis of a relationship between the value of the luminance pixel at the interpolation target pixel position and the value of the luminance pixel at the neighboring pixel position.

(6) In the information processing apparatus according to (5), the interpolation target color difference pixel generator generates the interpolation target color difference pixel by using a linear relationship as the positive correlation on the basis of the relationship between the value of the luminance pixel at the interpolation target pixel position and the value of the luminance pixel at the neighboring pixel position.

(7) In the information processing apparatus according to (6), the interpolation target color difference pixel generator calculates an average value of multiplication values of a ratio of the value of the luminance pixel at the interpolation target pixel position to the value of the luminance pixel at the neighboring pixel position and values of the color difference pixels at a plurality of the neighboring pixel positions and generates the interpolation target color difference pixel.

(8) In the information processing apparatus according to (5), the value of the interpolation target color difference pixel is obtained by using a value obtained by adding an offset value to each of the value of the luminance pixel at the interpolation target pixel position and the value of the luminance pixel at the neighboring pixel position.

(9) In the information processing apparatus according to (8), the offset value is a value determined on the basis of the value of the luminance pixel at the neighboring pixel position.

(10) In the information processing apparatus according to any of (4) to (9), the interpolation target color difference pixel generator generates the interpolation target color difference pixel on the basis of a luminance difference that is a value of a difference between the value of the luminance pixel at the interpolation target pixel position and the value of the luminance pixel at the neighboring pixel position, the luminance difference being a relationship between the value of the luminance pixel at the interpolation target pixel position and the value of the luminance pixel at the neighboring pixel position.

(11) In the information processing apparatus according to (10), the interpolation target color difference pixel generator calculates a value of the interpolation target color difference pixel by a weighted average using the luminance difference.

(12) The information processing apparatus according to any of (1) to (11) further includes a generation method determiner that determines a generation method of the interpolation target color difference pixel on the basis of a relationship between a value of the luminance pixel at the interpolation target pixel position and a value of the luminance pixel at the neighboring pixel position.

(13) In the information processing apparatus according to (12), the generation method determiner determines the generation method on the basis of a magnitude of the luminance difference.

(14) In the information processing apparatus according to (12) or (13), in a case where a magnitude of an absolute value of the luminance difference is larger than a predetermined value, the generation method determiner determines the generation method as a method of generating the interpolation target color difference pixel on the basis of the luminance difference.

(15) In the information processing apparatus according to any of (12) to (14), the generation method determiner determines a method of generating the interpolation target color difference pixel on the basis of a magnitude relationship between the value of the luminance pixel at the interpolation target pixel position and the value of the luminance pixel at the neighboring pixel position.

(16) The information processing apparatus according to any of (1) to (15) further includes a neighboring pixel position selector that selects one or two or more of the neighboring pixel positions among the plurality of pixel positions near the interpolation target pixel position.

(17) The information processing apparatus according to any of (1) to (16) further includes a white balance processor that performs, on the basis of user setting, white balance on the image data in which the first color difference pixel at the interpolation target pixel position is generated by the interpolation target color difference pixel generator.

(18) The information processing apparatus according to any of (1) to (17) further includes an imaging unit that captures a captured image corresponding to the three primary color pixels.

(19) An information processing method includes generating, on the basis of a relationship between a luminance pixel at an interpolation target pixel position that is a pixel position at which a first color difference pixel does not exist and the luminance pixel at at least one neighboring pixel position of a plurality of pixel positions near the interpolation target pixel position in image data, an interpolation target color difference pixel corresponding to the first color difference pixel at the interpolation target pixel position, in which the image data is generated on the basis of three primary color pixels that can include a value greater than a predetermined white clip value, the image data having a number of the luminance pixels larger than a number of the first color difference pixels and a number of second color difference pixels.

(20) An information processing program causes a computer to execute an information processing method including generating, on the basis of a relationship between a luminance pixel at an interpolation target pixel position that is a pixel position at which a first color difference pixel does not exist and the luminance pixel at at least one neighboring pixel position of a plurality of pixel positions near the interpolation target pixel position in image data, an interpolation target color difference pixel corresponding to the first color difference pixel at the interpolation target pixel position, in which the image data is generated on the basis of three primary color pixels that can include a value greater than a predetermined white clip value, the image data having a number of the luminance pixels larger than a number of the first color difference pixels and a number of second color difference pixels.

REFERENCE SIGNS LIST

12 Imaging unit
100, 200, 300, 400 Information processing apparatus
102, 201, 302, 403 Interpolation target color difference pixel generator
301 Generation method determiner

The invention claimed is:

1. An information processing apparatus comprising: a memory storing a program, and at least one processor configured to execute the program to perform operations comprising:
generating, on a basis of a relationship between a luminance pixel at an interpolation target pixel position that is a pixel position at which a first color difference pixel does not exist and an other luminance pixel at a neighboring pixel position of a plurality of pixel positions near the interpolation target pixel position in image data, an interpolation target color difference pixel corresponding to the first color difference pixel at the interpolation target pixel position,
wherein the image data is generated on a basis of three primary color pixels configured to include a value greater than a predetermined white clip value, the image data having a number of luminance pixels larger than a number of first color difference pixels and a number of second color difference pixels; using a positive correlation between a value of the luminance pixel and a magnitude of a value of the first color difference pixel on a basis of a relationship between the value of the luminance pixel at the interpolation target pixel position and the value of the other luminance pixel at the neighboring pixel position; using a linear relationship as the positive correlation on a basis of the relationship between the value of the luminance pixel at the interpolation target pixel position and the value of the other luminance pixel at the neighboring pixel position; and calculating an average value of multiplication values of a ratio of the value of the luminance pixel at the interpolation target pixel position to the value of the other luminance pixel at the neighboring pixel position and values of color difference pixels at a plurality of neighboring pixel positions and generating the interpolation target color difference pixel.

2. The information processing apparatus according to claim 1, wherein the operations further comprise:
determining a generation method of the interpolation target color difference pixel on a basis of a relationship between a value of the luminance pixel at the interpolation target pixel position and a value of the luminance pixel at the neighboring pixel position.

3. The information processing apparatus according to claim 2, wherein determining the generation method is on a basis of a magnitude of luminance difference.

4. The information processing apparatus according to claim 2, wherein, the operations further comprise:
in a case where a magnitude of an absolute value of luminance difference is larger than a predetermined value, determining the generation method as a method of generating the interpolation target color difference pixel on a basis of the luminance difference.

5. The information processing apparatus according to claim 2, wherein the operations further comprise:
determining a method of generating the interpolation target color difference pixel on a basis of a magnitude relationship between the value of the luminance pixel at the interpolation target pixel position and the value of the luminance pixel at the neighboring pixel position.

6. The information processing apparatus according to claim 1, wherein the operations further comprise:
selecting the neighboring pixel position.

7. The information processing apparatus according to claim 1, wherein the operations further comprise:
performing, on a basis of user setting, white balance on the image data in which the first color difference pixel at the interpolation target pixel position is generated.

8. The information processing apparatus according to claim 1, wherein the operations further comprise:
capturing, by an imaging unit, a captured image corresponding to the three primary color pixels.

9. An information processing method comprising:
generating on a basis of a relationship between a luminance pixel at an interpolation target pixel position that is a pixel position at which a first color difference pixel does not exist and an other luminance pixel at a neighboring pixel position of a plurality of pixel positions near the interpolation target pixel position in image data, an interpolation target color difference pixel corresponding to the first color difference pixel at the interpolation target pixel position,
wherein the image data is generated on a basis of three primary color pixels configured to include a value greater than a predetermined white clip value, the image data having a number of luminance pixels larger than a number of first color difference pixels and a number of second color difference pixels; using a positive correlation between a value of the luminance pixel and a magnitude of a value of the first color difference pixel on a basis of a relationship between the value of the luminance pixel at the interpolation target pixel position and the value of the other luminance pixel at the neighboring pixel position; using a linear relationship as the positive correlation on a basis of the relationship between the value of the luminance pixel at the interpolation target pixel position and the value of the other luminance pixel at the neighboring pixel position; and calculating an average value of multiplication values of a ratio of the value of the luminance pixel at the interpolation target pixel position to the value of the other luminance pixel at the neighboring pixel position and values of color difference pixels at a plurality of neighboring pixel positions and generating the interpolation target color difference pixel.

10. A non-transitory computer readable medium storing a program, the program being executable by a processor to perform operations comprising:
    generating on a basis of a relationship between a luminance pixel at an interpolation target pixel position that is a pixel position at which a first color difference pixel does not exist and an other luminance pixel at a neighboring pixel position of a plurality of pixel positions near the interpolation target pixel position in image data, an interpolation target color difference pixel corresponding to the first color difference pixel at the interpolation target pixel position,
    wherein the image data is generated on a basis of three primary color pixels configured to include a value greater than a predetermined white clip value, the image data having a number of luminance pixels larger than a number of first color difference pixels and a number of second color difference pixels; using a positive correlation between a value of the luminance pixel and a magnitude of a value of the first color difference pixel on a basis of a relationship between the value of the luminance pixel at the interpolation target pixel position and the value of the other luminance pixel at the neighboring pixel position; using a linear relationship as the positive correlation on a basis of the relationship between the value of the luminance pixel at the interpolation target pixel position and the value of the other luminance pixel at the neighboring pixel position; and calculating an average value of multiplication values of a ratio of the value of the luminance pixel at the interpolation target pixel position to the value of the other luminance pixel at the neighboring pixel position and values of color difference pixels at a plurality of neighboring pixel positions and generating the interpolation target color difference pixel.

11. The non-transitory computer readable medium according to claim 10, wherein the operations further comprise:
    determining a generation method of the interpolation target color difference pixel on a basis of a relationship between a value of the luminance pixel at the interpolation target pixel position and a value of the luminance pixel at the neighboring pixel position.

12. The non-transitory computer readable medium according to claim 11, wherein determining the generation method is on a basis of a magnitude of luminance difference.

13. The non-transitory computer readable medium according to claim 11, wherein the operations further comprise:
    in a case where a magnitude of an absolute value of luminance difference is larger than a predetermined value, determining the generation method as a method of generating the interpolation target color difference pixel on a basis of the luminance difference.

14. The non-transitory computer readable medium according to claim 11, wherein the operations further comprise:
    determining a method of generating the interpolation target color difference pixel on a basis of a magnitude relationship between the value of the luminance pixel at the interpolation target pixel position and the value of the luminance pixel at the neighboring pixel position.

15. The non-transitory computer readable medium according to claim 10, wherein the operations further comprise:
    selecting the neighboring pixel position.

16. The non-transitory computer readable medium according to claim 10, wherein the operations further comprise:
    performing, on a basis of user setting, white balance on the image data in which the first color difference pixel at the interpolation target pixel position is generated.

17. The non-transitory computer readable medium according to claim 10, wherein the operations further comprise:
    capturing, by an imaging unit, a captured image corresponding to the three primary color pixels.

* * * * *